US009938760B2

(12) United States Patent
Makino et al.

(10) Patent No.: US 9,938,760 B2
(45) Date of Patent: Apr. 10, 2018

(54) DOOR OPENING AND CLOSING APPARATUS FOR VEHICLE

(71) Applicant: AISIN SEIKI KABUSHIKI KAISHA, Kariya-shi (JP)

(72) Inventors: Sadayuki Makino, Nagoya (JP); Kenta Mori, Kariya (JP); Yuki Ishiguro, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 161 days.

(21) Appl. No.: 15/032,253

(22) PCT Filed: Oct. 23, 2014

(86) PCT No.: PCT/JP2014/078229
§ 371 (c)(1),
(2) Date: Apr. 26, 2016

(87) PCT Pub. No.: WO2015/064471
PCT Pub. Date: May 7, 2015

(65) Prior Publication Data
US 2016/0245010 A1    Aug. 25, 2016
US 2017/0247931 A2    Aug. 31, 2017

(30) Foreign Application Priority Data

Oct. 28, 2013   (JP) ................................ 2013-223479
Oct. 28, 2013   (JP) ................................ 2013-223483

(51) Int. Cl.
*E05B 81/38*    (2014.01)
*E05F 15/662*   (2015.01)
(Continued)

(52) U.S. Cl.
CPC ............. *E05F 15/662* (2015.01); *B60J 5/047* (2013.01); *E05B 79/20* (2013.01); *E05B 81/06* (2013.01);
(Continued)

(58) Field of Classification Search
CPC ............... F16H 3/66; F16H 2200/2007; F16H 2200/2035; F16H 37/122; E05F 15/662;
(Continued)

(56) References Cited

U.S. PATENT DOCUMENTS 6,179,742 B1 * 1/2001 Haag ..................... E05F 15/643
                                                    475/154
7,644,540 B2 * 1/2010 Ichinose ............... E05F 15/646
                                                     49/339
(Continued)

FOREIGN PATENT DOCUMENTS

JP    3694493 B2    9/2005

OTHER PUBLICATIONS

English translation of the International Preliminary Report on Patentability and Written Opinion dated May 3, 2016 in PCT/JP2014/078229.
(Continued)

*Primary Examiner* — Roger L Pang
(74) *Attorney, Agent, or Firm* — Oblon, McClelland, Maier & Neustadt, L.L.P.

(57) ABSTRACT

A door opening and closing apparatus for a vehicle includes a transmission gear configured to be driven to rotate by a motor, a pulley arranged coaxially with the transmission gear and configured to open and close a vehicle door by moving a rope member with a rotation of the pulley, an output member arranged coaxially with the transmission gear and configured to bring a door lock to a holding state or a release state with a rotation of the output member, a first
(Continued)

clutch housed in the pulley in a state being coaxial with the transmission gear, the first clutch selectively permitting and prohibiting a rotation transmission between the transmission gear and the pulley, and a second clutch housed in the transmission gear in a state being coaxial with the transmission gear, the second clutch selectively permitting and prohibiting a rotation transmission between the transmission gear and the output member.

12 Claims, 13 Drawing Sheets

(51) Int. Cl.
| | |
|---|---|
| E05F 15/643 | (2015.01) |
| B60J 5/04 | (2006.01) |
| E05B 81/06 | (2014.01) |
| E05B 83/40 | (2014.01) |
| F16H 37/12 | (2006.01) |
| E05F 15/646 | (2015.01) |
| E05B 79/20 | (2014.01) |
| E05B 81/20 | (2014.01) |
| E05B 81/24 | (2014.01) |
| E05B 81/46 | (2014.01) |
| F16H 3/66 | (2006.01) |
| E05D 15/10 | (2006.01) |

(52) U.S. Cl.
CPC .............. *E05B 81/20* (2013.01); *E05B 81/25* (2013.01); *E05B 81/38* (2013.01); *E05B 81/46* (2013.01); *E05B 83/40* (2013.01); *E05F 15/643* (2015.01); *E05F 15/646* (2015.01); *F16H 37/122* (2013.01); *E05D 15/10* (2013.01); *E05Y 2201/22* (2013.01); *E05Y 2201/72* (2013.01); *E05Y 2900/531* (2013.01); *F16H 3/66* (2013.01); *F16H 2200/2007* (2013.01); *F16H 2200/2035* (2013.01)

(58) Field of Classification Search
CPC ...... E05F 15/646; E05F 15/643; E05B 79/20; E05B 81/38; E05B 81/20; E05B 81/25; E05B 81/46; E05B 81/06; E05B 83/40; B60J 5/047; E05Y 2201/72; E05Y 2201/22; E05Y 2900/531
USPC ....... 475/150, 151, 154, 271, 290; 74/665 F, 74/665 G, 665 GA, 665 GE
See application file for complete search history.

(56) References Cited

U.S. PATENT DOCUMENTS

| | | | |
|---|---|---|---|
| 2002/0033059 A1* | 3/2002 | Pels .................. | B60K 6/26 74/329 |
| 2003/0051577 A1* | 3/2003 | Hirt .................. | F16H 3/006 74/664 |
| 2005/0039405 A1 | 2/2005 | Yokomori | |
| 2008/0105011 A1 | 5/2008 | Machida et al. | |
| 2010/0180508 A1 | 7/2010 | Yamaguchi et al. | |

OTHER PUBLICATIONS

International Search Report dated Dec. 9, 2014 in PCT/JP2014/078229 Filed Oct. 23, 2014.

\* cited by examiner

DOOR OPENING AND CLOSING APPARATUS FOR VEHICLE

TECHNICAL FIELD

This invention relates to a door opening and closing apparatus for a vehicle.

BACKGROUND ART

A known door opening and closing apparatus for a vehicle is disclosed, for example, in Patent document 1. The aforementioned apparatus includes a wire drum for opening and closing a vehicle door (slide door) by reeling in and out a door opening cable and a door closing cable with a rotation of the wire drum. The apparatus also includes a swing arm for disengaging a pawl (ratchet) from a latch of a door lock that holds the vehicle door in a fully closed state with a rotation of the swing arm. A first clutch is disposed between the wire drum and a first worm wheel meshed with an output shaft (cylinder worm) of a motor. A second clutch is disposed between the swing arm and a second worm wheel meshed with the output shaft. The first clutch and the second clutch are controlled to achieve the rotation of the wire drum and the rotation of the swing arm while the single motor is continuously rotating.

DOCUMENT OF PRIOR ART

Patent Document

Patent document 1: Japanese Patent 3694493

OVERVIEW OF INVENTION

Problem to be Solved by Invention

In Patent document 1, the wire drum, the first clutch and the first worm wheel are supported at a first support shaft which is disposed at one side in a radial direction with reference to an axis of the output shaft of the motor. A second support shaft which is in parallel with the first support shaft is disposed at the other side in the radial direction relative to the output shaft of the motor. The swing arm, the second clutch and the second worm wheel are supported at the second support shaft. Thus, an occupation area of the door opening and closing apparatus for the vehicle under a condition where the door opening and closing apparatus for the vehicle is projected in an axial direction of the output shaft of the motor increases, which deteriorates mountability of the door opening and closing apparatus at the vehicle door.

Means for Solving Problem

An object of the present invention is to provide a door opening and closing apparatus for a vehicle that may restrain an increase in size in a direction orthogonal to an axial direction.

A door opening and closing apparatus for a vehicle which solves the aforementioned drawbacks includes a transmission gear configured to be driven to rotate by a motor, a pulley arranged coaxially with the transmission gear and configured to open and close a vehicle door by moving a rope member with a rotation of the pulley, an output member arranged coaxially with the transmission gear and configured to bring a door lock to a holding state in which the vehicle door is held or a release state in which the holding of the vehicle door is released with a rotation of the output member, a first clutch housed in the pulley in a state being coaxial with the transmission gear, the first clutch selectively permitting and prohibiting a rotation transmission between the transmission gear and the pulley, and a second clutch housed in the transmission gear in a state being coaxial with the transmission gear, the second clutch selectively permitting and prohibiting a rotation transmission between the transmission gear and the output member.

Another door opening and closing apparatus for a vehicle which solves the aforementioned drawbacks includes a single support shaft of which opposed ends are supported by a support member, a transmission gear within which the support shaft is inserted to be positioned and which is configured to be driven to rotate by a motor, a pulley configured to open and close a vehicle door by moving a rope member with a rotation of the pulley around an axis of the support shaft, an output member configured to bring a door lock to a holding state in which the vehicle door is held or a release state in which the holding of the vehicle door is released with a rotation of the output member around the axis of the support shaft, a first clutch within which the support shaft is inserted to be positioned, the first clutch selectively permitting and prohibiting a rotation transmission between the transmission gear and the pulley, and a second clutch within which the support shaft is inserted to be positioned, the second clutch selectively permitting and prohibiting a rotation transmission between the transmission gear and the output member.

MODE FOR CARRYING OUT THE INVENTION

First Embodiment

A first embodiment of a door opening and closing apparatus for a vehicle is explained below. In the following explanation, "front" "rear" "front-rear direction" and "width direction" are based on a vehicle.

Figure 1:
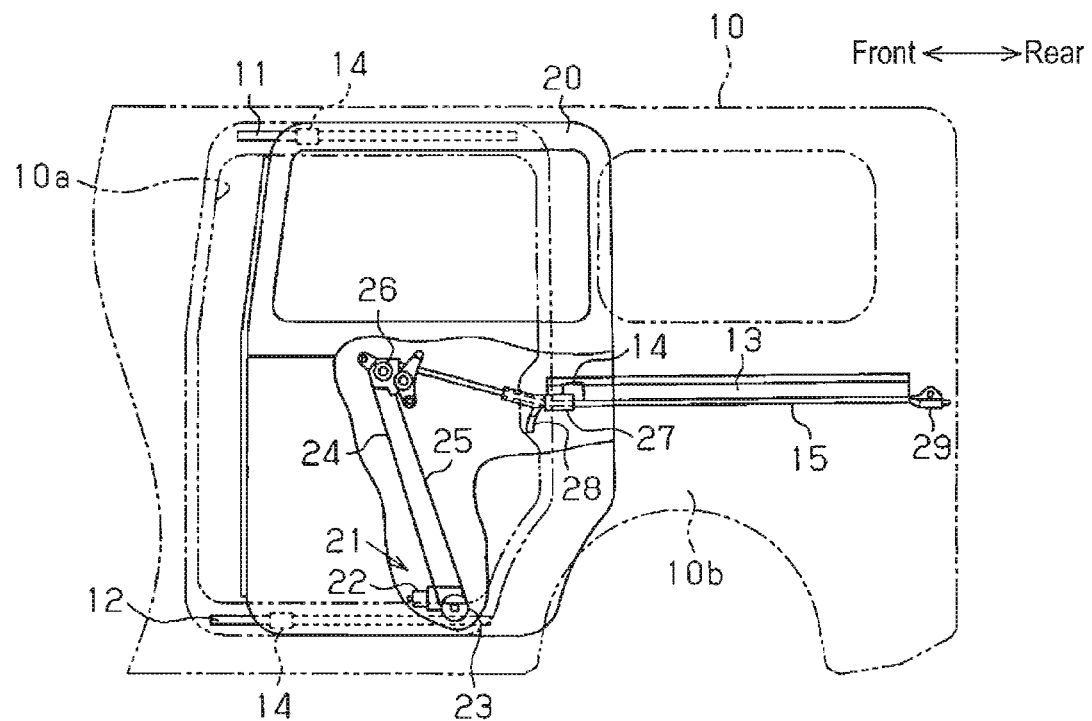
FIG. 1 is a side view schematically illustrating a vehicle including a door opening and closing apparatus for a vehicle according to a first embodiment of the present invention.

As illustrated in FIG. 1, a door opening 10a is provided at a side portion of a vehicle body 10. An upper rail 11 and a lower rail 12 are arranged at the vehicle body 10 so as to extend along an upper edge and a lower edge of the door opening 10a respectively. A center rail 13 is arranged at a quarter panel 10b positioned at a rear side of the door opening 10a so as to extend in the front-rear direction. A vehicle door, i.e., a slide door 20, is supported to be movable in the front-rear direction relative to the upper rail 11, the lower rail 12 and the center rail 13 via respective guide roller units 14. The slide door 20 opens and closes the door opening 10a by moving in the front-rear direction. A cable guide 15 is provided at the quarter panel 10b so as to extend along a lower edge of the center rail 13 over a substantially entire length of the center rail 13.

A drive member 21 (or a drive unit) is fixed to an inner portion at a lower portion of the slide door 20. The drive member 21 includes a motor 22 and a pulley, i.e., a drum 23, which is driven to rotate by the motor 22. A first cable 24 and a second cable 25 serving as a rope member are wound at the drum 23. The first cable 24 corresponds to a first portion of the rope member and the second cable 25 corresponds to a second portion of the rope member. Each of the first and second cables 24 and 25 including a first end which is connected to the drum 23 is wound at the drum 23. The first and second cables 24 and 25 are selectively reeled in and out with a driving of the drive member 21.

An intermediate pulley 26 is provided at the slide door 20. In addition, a guide pulley 27 is connected to the guide roller unit 14 that moves at the center rail 13. Each of the first and second cables 24 and 25 passes from the slide door 20 to the vehicle body 10 through the intermediate pulley 26 and the guide pulley 27 to extend along the cable guide 15 in the front-rear direction. The first cable 24 is guided by the cable guide 15 to be arranged forward in the vehicle. The first cable 24 is connected to the vehicle body 10 in the vicinity of a front end of the cable guide 15 via a tensioner 28 which is connected to a second end of the first cable 24. The second cable 25 is guided by the cable guide 15 to be arranged rearward in the vehicle. The second cable 25 is connected to the vehicle body 10 in the vicinity of a rear end of the cable guide 15 via a tensioner 29 which is connected to a second end of the second cable 25.

For example, in a case where the first cable 24 is reeled out and the second cable 25 is reeled in by the drive member 21, the slide door 20 moves rearward in the vehicle to open the door opening 10a. On the other hand, in a case where the first cable 24 is reeled in and the second cable 25 is reeled out by the drive member 21, the slide door 20 moves forward in the vehicle to close the door opening 10a.

Figure 2:
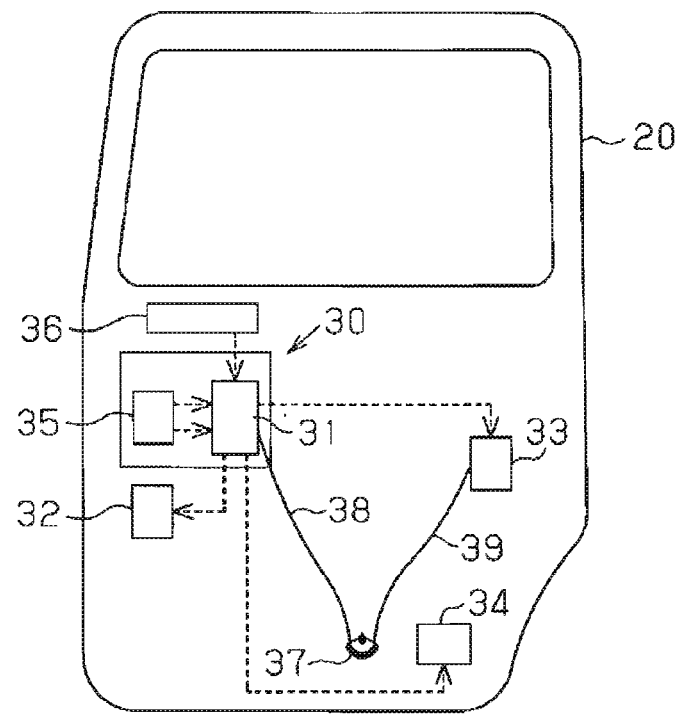
FIG. 2 is a side view schematically illustrating the door opening and closing apparatus for the vehicle illustrated in FIG. 1.

As illustrated in FIG. 2, a remote controller 30 is mounted within the slide door 20. The remote controller 30 includes a mechanical portion 31 which is known to be constituted by plural levers. Door locks, i.e., a front lock 32 and a rear lock 33, are mounted at a front portion and a rear portion of the slide door 20 respectively. A fully open lock 34 serving as the door lock is mounted at a lower portion of the slide door 20.

Each of the front lock 32 and the rear lock 33 holds the slide door 20 to be in a closed state (a fully closed state or in a half closed state) by engaging with the vehicle body 10 or brings the slide door 20 which is in the closed state to an opening allowable state by disengaging from the vehicle body 10. The fully open lock 34 holds the slide door 20 to be in a fully open state by engaging with the vehicle body 10 or brings the slide door 20 which is in the fully open state to a closing allowable state by disengaging from the vehicle body 10.

Figure 3A:
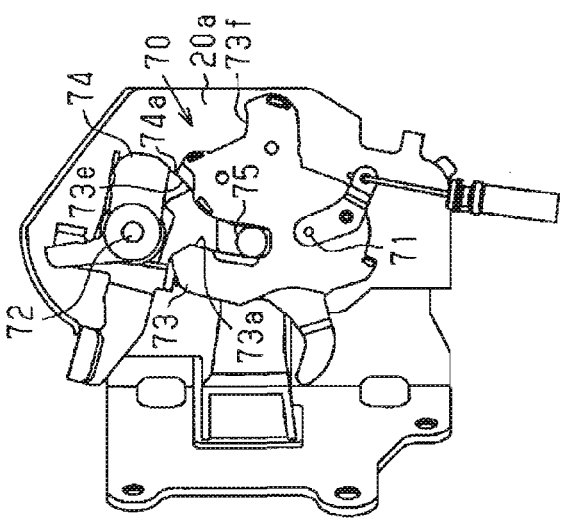
FIGS. 3A, 3B and 3C are explanatory views each of which illustrates an operation of a latch mechanism.
Figure 3B:
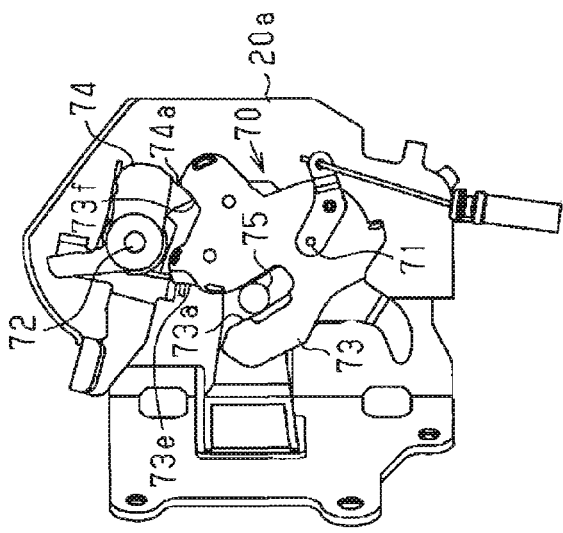
Figure 3C:
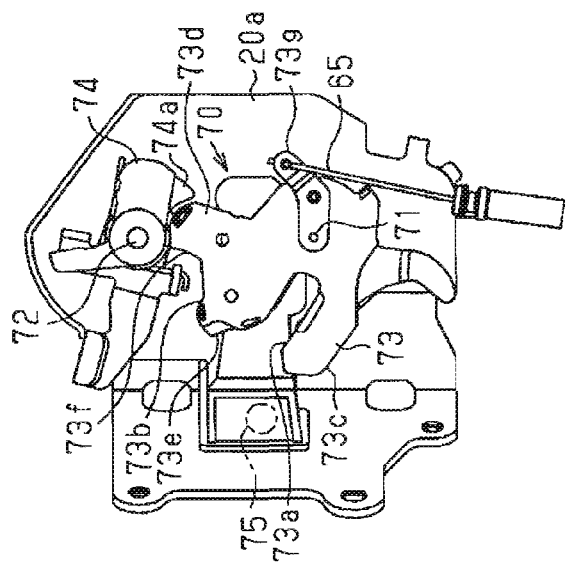

A construction of the rear lock 33 is explained. As illustrated in FIG. 3A to FIG. 3C, a base plate 20a is fixed to the slide door 20. The rear lock 33 includes a latch mechanism 70 which is supported at the base plate 20a. The latch mechanism 70 includes a latch 73 and a pawl 74 which are rotatable respectively around a pair of rotation shafts 71 and 72 arranged at the base plate 20a and in parallel with each other.

The latch 73 includes an engagement recess portion 73a in a substantially U-shape form. The latch 73 includes a first protruding portion 73b and a second protruding portion 73c at one side and the other side, respectively, with reference to the engagement recess portion 73a. The latch 73 also includes a third protruding portion 73d protruding from an intermediate portion of the first protruding portion 73b in a longitudinal direction thereof. A tip end portion of the first protruding portion 73b in a circumferential direction forms a fully latched engagement surface 73e. An end surface of the third protruding portion 73d in the circumferential direction facing the second protruding portion 73c forms a half latched engagement surface 73f. The latch 73 is biased by a latch biasing spring (not illustrated) in a counterclockwise rotation direction to be held at a predetermined rotation position (hereinafter also referred to as an "unlatched position") as illustrated in FIG. 3A. The latch 73 includes an interlocking piece 73g in an arm form extending from the rotation shaft 71 to a side opposite from the engagement recess portion 73a.

The pawl 74 includes an engagement end portion 74a in a substantially claw form protruding from the rotation shaft 72 in a radial direction thereof (right side in FIG. 3A). The pawl 74 is biased in a clockwise rotation direction in the drawing by a pawl biasing spring (not illustrated), i.e., in a direction where the engagement end portion 74a moves closer to the third protruding portion 73d so as to be held at a predetermined rotation position illustrated in FIG. 3A.

Next, a basic operation of the latch mechanism 70 is explained. As illustrated in FIG. 3A, in a state where the slide door 20 is open, the engagement recess portion 73a of the latch 73 held at the unlatched position is arranged facing a striker 75 which is fixed to the vehicle body 10. That is, the engagement recess portion 73a opens an entry path of the striker 75 for the closing operation of the slide door 20. The engagement end portion 74a of the pawl 74 held at the predetermined rotation position is disposed at an upper side of the third protruding portion 73d. The state of the latch mechanism 70 at this time corresponds to an unlatched state (release state).

Next, as indicated by a shifting from FIG. 3A to FIG. 3B, in a case where the striker 75 enters into the engagement recess portion 73a in association with the closing operation of the slide door 20, the striker 75 presses an inner wall surface of the engagement recess portion 73a to thereby rotate the latch 73 in the clockwise rotation direction against the latch biasing spring. The half latched engagement surface 73f engages with the engagement end portion 74a so that the rotation of the latch 73 is inhibited. At this time, the slide door 20 is in the half closed state where the striker 75 engages with the engagement recess portion 73a so that the striker 75 is inhibited from disengaging. The state of the latch mechanism 70 at this time corresponds to a half latched state and the rotation position of the latch 73 at this time corresponds to a half latched position.

Next, as indicated by a shifting from FIG. 3B to FIG. 3C, in a case where the striker 75 further enters into the engagement recess portion 73a with the further closing operation of the slide door 20, the inner wall surface of the engagement recess portion 73a is pressed by the striker 75 to thereby further rotate the latch 73 in the clockwise rotation direction against the latch biasing spring. The fully latched engagement surface 73e engages with the engagement end portion 74a so that the rotation of the latch 73 is inhibited. At this time, the slide door 20 is in the fully closed state where the striker 75 engages with the engagement recess portion 73a so that the striker 75 is inhibited from disengaging. The state of the latch mechanism 70 at this time corresponds to a fully latched state (engagement state) and the rotation position of the latch 73 at this time corresponds to a fully latched position.

In the half latched state or the fully latched state, in a case where the pawl 74 rotates in the counterclockwise rotation direction against the pawl biasing spring, the engagement of the engagement end portion 74a with the half latched engagement surface 73f or with the fully latched engagement surface 73e is released. At this time, the striker 75 which is retracting from the engagement recess portion 73a presses the inner wall surface of the engagement recess portion 73a because the slide door 20 starts opening by a repulsive force of a seal member, for example. The latch 73 thus rotates in the counterclockwise rotation direction. Then, the engagement of the striker 75 with the engagement recess portion 73a is released so that the slide door 20 may open.

The front lock 32 includes the latch mechanism 70 similar to that of the rear lock 33 except that the interlocking piece 73g of the latch 73 is omitted and operates in the similar way to the rear lock 33. The fully open lock 34 includes the latch mechanism 70 similar to that of the rear lock 33 and operates in the similar way to the rear lock 33 under a condition that "opening" and "closing" in the rear lock 33 are replaced with "closing" and "opening" in the fully open lock 34.

Each of the front lock 32 and the rear lock 33 is mechanically connected to the mechanical portion 31 of the remote controller 30 via the pawl 74. In a case where a release operation force is input to each of the front lock 32 and the rear lock 33 from the mechanical portion 31, the slide door 20 is brought to the opening allowable state relative to the vehicle body 10 as mentioned above. The fully open lock 34 is also mechanically connected to the mechanical portion 31 of the remote controller 30 via the pawl 74. In a case where the release operation force is input to the fully open lock 34 from the mechanical portion 31, the slide door 20 is brought to the closing allowable state relative to the vehicle body 10. The release operation force corresponds to an operation force for rotating the pawl 74 against the pawl biasing spring so as to cancel the holding state of the slide door 20 by the latch mechanism 70.

As illustrated in FIG. 2, an inside handle 35 is provided at a vehicle inner side portion of the slide door 20. The inside handle 35 is mechanically connected to the mechanical portion 31 of the remote controller 30 so that the release operation force is input to each of the front lock 32, the rear lock 33 and the fully open lock 34 via the mechanical portion 31.

For example, in the closed state of the slide door 20, in a case where a passenger operates the inside handle 35 to a rear side in the vehicle from a neutral position (hereinafter referred to as an "opening direction"), the release operation force is input to each of the front lock 32 and the rear lock 33 via the mechanical portion 31 by the inside handle 35. As a result, each of the front lock 32 and the rear lock 33 brings the slide door 20 to the opening allowable state relative to the vehicle body 10.

On the other hand, in the fully open state of the slide door 20, in a case where the passenger operates the inside handle 35 to a front side in the vehicle from the neutral position (hereinafter referred to as a "closing direction"), the release operation force is input to the fully open lock 34 via the mechanical portion 31 by the inside handle 35. Accordingly, the fully open lock 34 brings the slide door 20 to the closing allowable state relative to the vehicle body 10.

An outside handle 36 is provided at a vehicle outer side portion of the slide door 20. The outside handle 36 is mechanically connected to the mechanical portion 31 of the remote controller 30 so that the release operation force is input to each of the front lock 32, the rear lock 33 and the fully open lock 34 via the mechanical portion 31.

An output lever 37 serving as an output member which is driven to rotate by the motor 22 is provided at the inner portion of the lower portion of the slide door 20. The output lever 37 is arranged coaxially with the drum 23. The output lever 37 is mechanically connected to the mechanical portion 31 of the remote controller 30 via a release cable 38. The output lever 37 is also mechanically connected to the rear lock 33 (latch 73) via a closer cable 39.

The output lever 37 rotates in a first direction so that the release operation force is input to each of the front lock 32, the rear lock 33 and the fully open lock 34 via the release cable 38 and the mechanical portion 31. As a result, the slide door 20 in the closed state as mentioned above is bought to the opening allowable state or the slide door 20 in the fully open state is brought to the closing allowable state.

In addition, the output lever 37 rotates in a second direction opposite from the first direction so that an engagement operation force is input to the rear lock 33 via the closer cable 39. The engagement operation force corresponds to an operation force for rotating the latch 73 of the rear lock 33 from the half latched position to the fully latched position against the latch biasing spring. As a result, the rear lock 33 is switched, together with the front lock 32, from a state holding the slide door 20 in the half closed state to a state holding the slide door 20 in the fully closed state.

Figure 4:
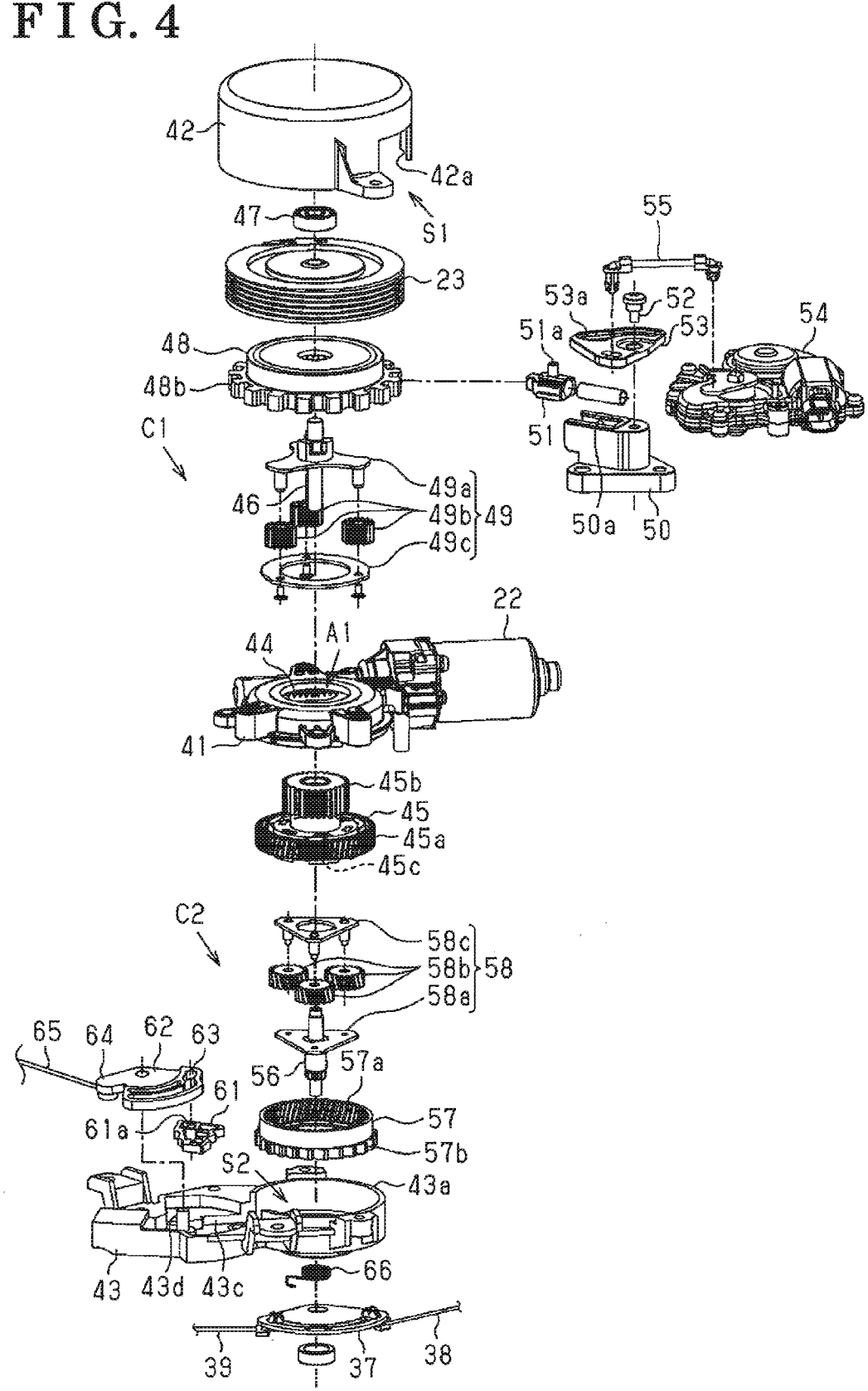
FIG. 4 is an exploded perspective view illustrating a drive member.
Figure 5:
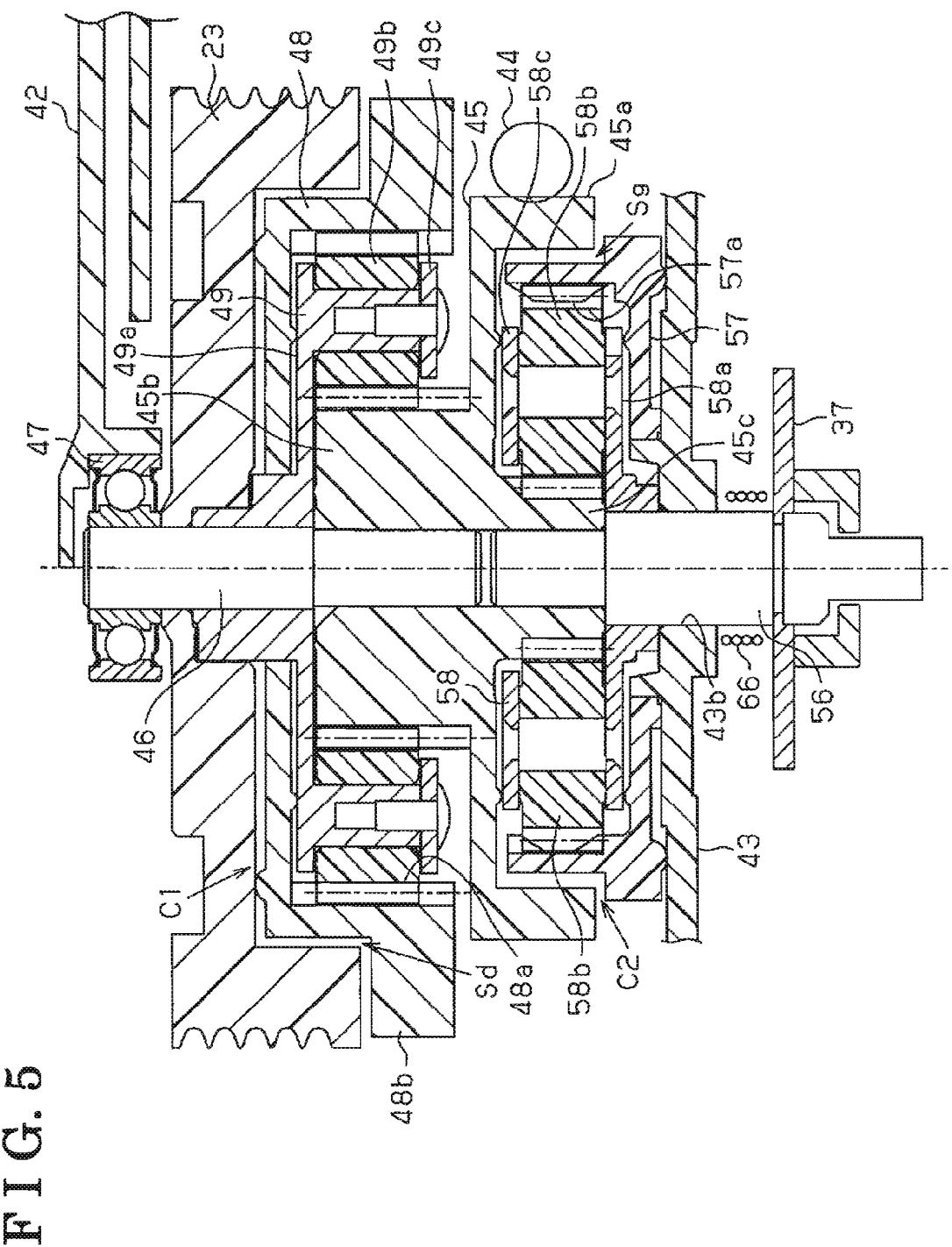
FIG. 5 is a longitudinal section view illustrating the drive member in FIG. 4.

Next, the construction of the drive member 21 is further explained. As illustrated in FIGS. 4 and 5, the drive member 21 includes a motor housing 41, a drum cover 42 serving as a first housing and a locking housing 43 serving as a second housing. The aforementioned members 41 to 43 constitute an outer configuration of the drive member 21. The motor housing 41 that supports the motor 22 is made of a resin material, for example. The motor housing 41 houses a worm 44 provided at a rotation shaft of the motor 22 in a manner that the worm 44 is rotatable. The motor housing 41 also houses a worm wheel portion 45a of a worm wheel 45 made of a resin material in a manner that the worm wheel portion 45a is rotatable. The worm wheel portion 45a serves as a transmission gear meshed with the worm 44. The worm wheel portion 45a is formed in a substantially cylindrical configuration including a lid wall portion and opening downward to form an accommodation void Sg. Because the worm 44 (motor 22) is arranged at an outer peripheral side of the worm wheel portion 45a, it is difficult to utilize a void at the outer side of the worm wheel portion 45a as a void for arranging other members. On the other hand, an inner peripheral portion of the worm wheel portion 45a is convenient to be used as an accommodation void. The worm wheel 45 integrally includes a first sun gear portion 45b and a second sun gear portion 45c which protrude from the lid wall portion of the worm wheel portion 45a upward and downward respectively to be coaxial with the worm wheel portion 45a. The second sun gear portion 45c is configured to be mostly housed within the accommodation void Sg. The first sun gear portion 45b and the second sun gear portion 45c include different diameters from each other. That is, the diameter of the first sun gear portion 45b is smaller than the diameter of the second sun gear portion 45c.

The drum cover 42, which is formed of a resin material, for example, is formed in a substantially cylindrical configuration including a lid wall portion and opening downward. The drum cover 42 houses the drum 23 so that the drum 23 is rotatable in a state where the drum cover 42 is fixed to an upper side surface of the motor housing 41. That is, the drum 23 is fixed to a first support shaft 46 which is coaxially arranged with the worm wheel 45 so as to rotate integrally with the first support shaft 46. One end of the first support shaft 46 is pivotally supported at the first sun gear portion 45b and the other end of the first support shaft 46 is pivotally supported at a bearing 47 fitted to the lid wall portion of the drum cover 42. According to the aforementioned construction, the drum 23 is rotatable within the drum cover 42.

The drum 23 is formed in a substantially cylindrical configuration including a lid wall portion and opening downward to form an accommodation void Sd. An axial length and a diameter of the drum 23 are relatively large. Thus, an inner peripheral portion of the drum 23 is convenient to be utilized as an accommodation void. The accommodation void Sd houses a first ring gear 48 and a first carrier 49. The first sun gear portion 45b, the first ring gear 48 and the first carrier 49 constitute a first clutch C1.

The first ring gear 48 is formed in a substantially cylindrical configuration including a lid wall portion and opening downward. The first ring gear 48 includes a first internal gear 48a provided at an inner peripheral portion of the first ring gear 48a. The first ring gear 48 also includes a large gear 48b in an annular form covering an opening end surface of the drum 23. The large gear 48b protrudes radially outward from an axial end of the first ring gear 48 projecting from the accommodation void Sd. The first internal gear 48a constitutes, together with the first sun gear portion 45b and the first carrier 49, a planetary gear mechanism.

The first carrier 49 includes a first holding plate 49a fixed to the first support shaft 46 to integrally rotate therewith and including a substantially Y-shaped plate form. The first carrier 49 also includes three of first planetary gears 49b respectively rotatably supported at three branched end portions of the first holding plate 49a. The first carrier 49 further includes a first carrier plate 49c in a substantially annular form. The first holding plate 49a and the first carrier plate 49c operate in cooperation so that three of the first planetary gears 49b are inhibited from disengaging in an axial direction between the first holding plate 49a and the first carrier plate 49c. In a state where the first carrier 49 is inserted to be positioned within the first ring gear 48, three of the first planetary gears 49b are meshed with the first internal gear 48a. In a state where the first sun gear portion 45b is inserted to be positioned within the first carrier 49, three of the first planetary gears 49b are meshed with the first sun gear portion 45b.

As illustrated in FIG. 4, the drum cover 42 houses, in addition to the drum 23, the first clutch C1. That is, the drum cover 42 constitutes, in cooperation with the motor housing 41, a first accommodation void S1 where the drum 23 and the first clutch C1 are housed. The drum cover 42 includes a guide bore 42a which opens in the radial direction so as to include a position of the large gear 48b in the axial direction. A guide block 50 is fixed to the drum cover 42 (or the motor housing 41) in a state facing the guide bore 42a in the radial direction. The guide block 50 includes a first guide groove 50a opening in the radial direction of the drum cover 42 at the position of the guide bore 42a. A first fixing block 51 is movably mounted at the first guide groove 50a.

In a case where the first fixing block 51 moves at the first guide groove 50a in the first direction where the first fixing block 51 approaches the first ring gear 48, the first fixing block 51 engages with the large gear 48b so that the first ring gear 48 becomes non-rotatable. At this time, the first sun gear portion 45b, the first internal gear 48a and the first carrier 49 function as an input shaft, a fixed shaft and an output shaft of the planetary gear mechanism. The rotation of the first sun gear portion 45b (worm wheel 45) is transmittable to the first carrier 49. The aforementioned state corresponds to a connection state of the first clutch C1.

On the other hand, in a case where the first fixing block 51 moves at the first guide groove 50a in the second direction where the first fixing block 51 separates from the first ring gear 48, the first fixing block 51 disengages from the large gear 48b so that the first ring gear 48 becomes rotatable. At this time, the rotation of the first sun gear portion 45b (worm wheel 45) is not transmittable to the first carrier 49. The aforementioned state corresponds to a disconnection state of the first clutch C1.

The first fixing block 51 includes an engagement pin 51a protruding at an upper side than the guide block 50. A first switching lever 53 in a substantially fan plate form is rotatably connected at an upper side surface of the guide block 50 via a pin 52. A cam bore 53a as an elongated bore is provided at a tip end portion of the first switching lever 53 so that the engagement pin 51a is inserted to be positioned within the cam bore 53a. In a case where the first switching lever 53 rotates about the pin 52 in the first direction, the engagement pin 51a is pushed out by means of the cam bore 53a so that the first fixing block 51 moves in the first direction approaching the first ring gear 48. Alternatively, in a case where the first switching lever 53 rotates about the pin 52 in the second direction, the engagement pin 51a is pulled in by means of the cam bore 53a so that the first fixing block 51 moves in the second direction separating from the first ring gear 48.

The first switching lever 53 is connected to a switching actuator 54 constituted mainly by an electric motor, for example, via a rod 55. The first switching lever 53 is selectively driven to rotate in the first direction and the second direction by the switching actuator 54. Timing at which the switching actuator 54 drives the first switching lever 53, i.e., switching timing of the first clutch C1, is controlled on a basis of an opening and closing position of the slide door 20 detected by a known door position sensor.

The locking housing 43 which is made of a resin material, for example, includes an accommodation portion 43a formed in a substantially cylindrical configuration including a bottom wall portion and opening upward. The locking housing 43 supports the worm wheel 45 so that the worm wheel 45 is rotatable. That is, a second support shaft 56 which is arranged to be coaxial with the worm wheel 45 is supported at the accommodation portion 43a. One end of the second support shaft 56 is inserted to and pivotally supported at a bearing bore 43b including a substantially circular configuration and provided at the bottom wall portion of the accommodation portion 43a as illustrated in FIG. 5. The other end of the second support shaft 56 is pivotally supported at the second sun gear portion 45c. Accordingly, the second sun gear portion 45c (worm wheel 45) is rotatably supported at the locking housing 43 via the second support shaft 56.

A second ring gear 57 and a second carrier 58 are housed in the accommodation void Sg. The second sun gear portion 45c, the second ring gear 57 and the second carrier 58 constitute a second clutch C2. That is, the locking housing 43 constitutes, in cooperation with the motor housing 41, a second accommodation void S2 where the worm wheel portion 45a and the second clutch C2 are housed. The motor housing 41 includes a penetration bore A1 connecting through the first accommodation void S1 and the second accommodation void S2. A diameter of the penetration bore A1 is greater than a diameter of the first sun gear portion 45b of the first clutch C1. That is, the first sun gear portion 45b is insertable to the penetration bore A1.

The second ring gear 57 is formed in a substantially cylindrical configuration including a bottom wall portion and opening upward. The second ring gear 57 includes a second internal gear 57a provided at an inner peripheral portion of the second ring gear 57 and a large gear 57b in an annular form. The large gear 57b protrudes radially outward from an axial end of the ring gear 57 projecting from the accommodation void Sg. The second internal gear 57a constitutes, together with the second sun gear portion 45c and the second carrier 58, a planetary gear mechanism.

The second carrier 58 includes a second holding plate 58a in a substantially triangular plate form fixed to the second support shaft 56 to integrally rotate therewith. The second carrier 58 also includes three of second planetary gears 58b respectively rotatably supported at three corner portions of the second holding plate 58a. The second carrier 58 further includes a second carrier plate 58c in a substantially triangular annular form. The second carrier plate 58c and the second holding plate 58a operate in cooperation so that three of the second planetary gears 58b are inhibited from disengaging in the axial direction between the second carrier plate 58c and the second holding plate 58a. In a state where the second carrier 58 is inserted to be positioned within the second ring gear 57, three of the second planetary gears 58b are meshed with the second internal gear 57a. In a state where the second sun gear portion 45c is inserted to be positioned within the second carrier 58, three of the second planetary gears 58b are meshed with the second sun gear portion 45c.

A second guide groove 43c is provided at the locking housing 43 which extends in the radial direction of the accommodation portion 43a so as to be continuously formed within the accommodation portion 43a. A second fixing block 61 is movably mounted at the second guide groove 43c at a position corresponding to the large gear 57b in the axial direction.

Figure 6A:
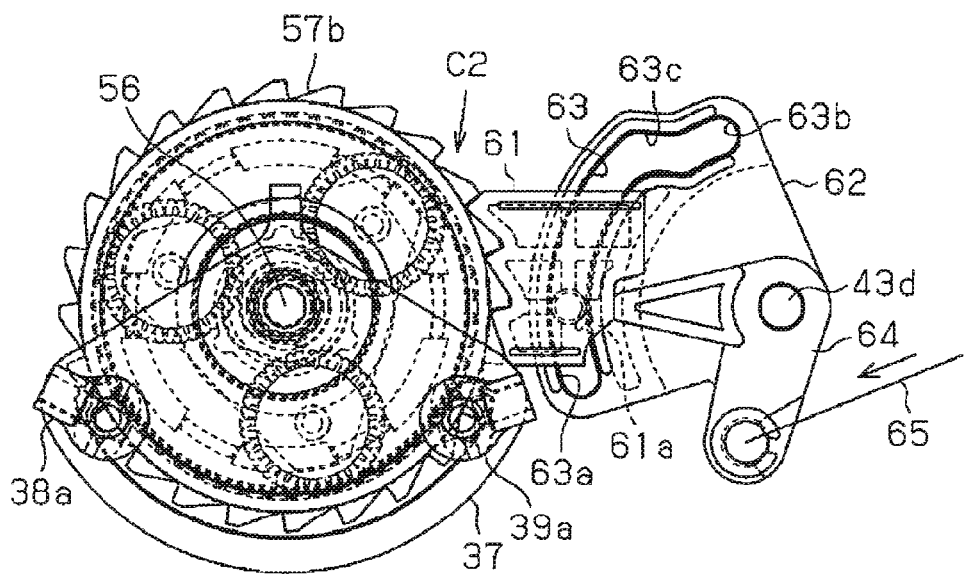
FIGS. 6A and 6B are explanatory views each of which illustrates an operation of a second clutch.

As illustrated in FIG. 6A, in a case where the second fixing block 61 moves at the second guide groove 43c in the first direction where the second fixing block 61 approaches the second ring gear 57, the second fixing block 61 engages with the large gear 57b so that the second ring gear 57 becomes non-rotatable. At this time, the second sun gear portion 45c, the second internal gear 57a and the second carrier 58 function as the input shaft, the fixed shaft and the output shaft of the planetary gear mechanism. The rotation of the second sun gear portion 45c (worm wheel 45) is transmittable to the second carrier 58. The aforementioned state corresponds to a connection state of the second clutch C2.

Figure 6B:
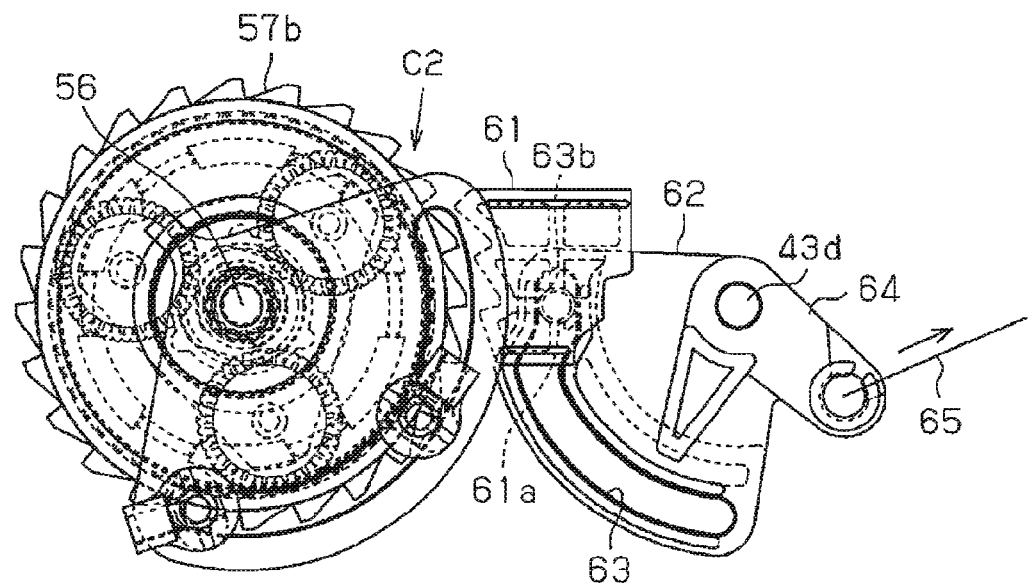

On the other hand, as illustrated in FIG. 6B, in a case where the second fixing block 61 moves at the second guide groove 43c in the second direction where the second fixing block 61 separates from the second ring gear 57, the second fixing block 61 disengages from the large gear 57b so that the second ring gear 57 becomes rotatable. At this time, the rotation of the second sun gear portion 45c (worm wheel 45) is not transmittable to the second carrier 58. The aforementioned state corresponds to a disconnection state of the second clutch C2.

The second fixing block 61 includes an engagement pin 61a protruding at one side (upward in FIG. 4). The locking housing 43 includes a shaft portion 43d in a pin form protruding upward at a portion away from the accommodation portion 43a relative to the second guide groove 43c. A second switching lever 62 in a substantially fan plate form is rotatably connected to the shaft portion 43d. A cam bore 63 as an elongated bore is provided at an end portion of the second switching lever 62 so that the engagement pin 61a is inserted to be positioned within the cam bore 63.

As illustrated in FIGS. 6A and 6B, the cam bore 63 includes a large diameter groove 63a in an arc form with reference to the shaft portion 43d at a portion at one side in the circumferential direction (preceding side in the counterclockwise rotation direction in FIG. 6). The cam bore 63 also includes a small diameter groove 63b in an arc form with reference to the shaft portion 43d at a portion at the other side in the circumferential direction (preceding side in the clockwise rotation direction in FIG. 6). The small diameter groove 63b extends at a closer portion relative to the shaft portion 43d as compared to the large diameter groove 63a. The large diameter groove 63a and the small diameter groove 63b are connected to each other via a guide groove 63c which is inclined. A circumferential length of the large diameter groove 63a is sufficiently greater than a circumferential length of the small diameter groove 63b.

Accordingly, in a case where the second switching lever 62 rotates about the shaft portion 43d in the first direction (clockwise rotation direction in FIG. 6), the engagement pin 61a is pushed out by means of the cam bore 63 (large diameter groove 63a) so that the second fixing block 61 moves in the first direction in which the second fixing block 61 approaches the second ring gear 57. Alternatively, in a case where the second switching lever 62 rotates about the shaft portion 43d in the second direction (counterclockwise rotation direction in FIG. 6), the engagement pin 61a is pulled in by means of the cam bore 63 (small diameter groove 63b) so that the second fixing block 61 moves in the second direction where the second fixing block 61 separates from the second ring gear 57.

The second switching lever 62 includes an arm portion 64 which protrudes in the radial direction with reference to the shaft portion 43d. One end of a door position interlocking cable 65 constituted by a push-pull cable, for example, is connected to the arm portion 64. The other end of the door position interlocking cable 65 is connected to the interlocking piece 73g of the rear lock 33. The arm portion 64 receives an engagement and disengagement operation force depending on the opening and closing position (opening and closing state) of the slide door 20 via the door position interlocking cable 65.

Figure 7A:
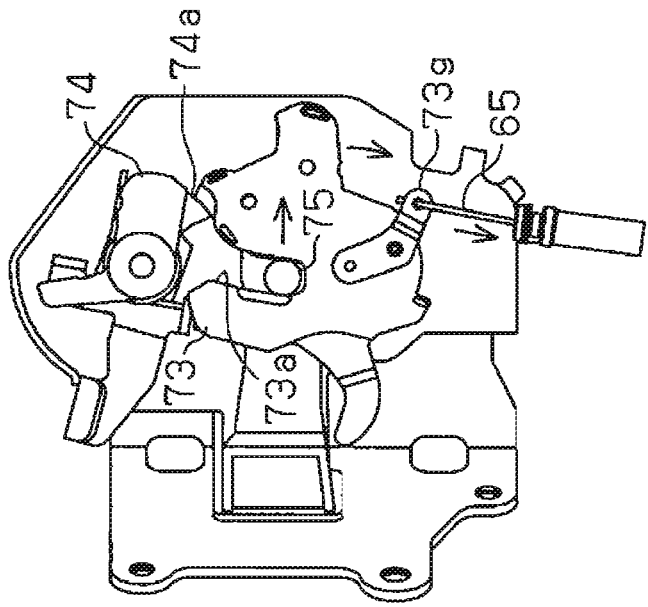
FIGS. 7A and 7B are explanatory views each of which illustrates an operation of the latch mechanism.

That is, as illustrated in FIG. 7A, in a case where the striker 75 enters into the engagement recess portion 73a of the latch 73 of the rear lock 33 with the closing operation of the slide door 20 from the open state, the striker 75 pushes the inner wall surface of the engagement recess portion 73a. Accordingly, the latch 73 starts rotating from the unlatched position to the fully latched position. Then, the latch 73 pushes the door position interlocking cable 65 via the interlocking piece 73g. At this time, as indicated by a shifting from FIG. 6B to FIG. 6A, the arm portion 64 is pushed by the door position interlocking cable 65 to thereby rotate the second switching lever 62 in the clockwise rotation direction in the drawing. Therefore, the second clutch C2 is brought to the connection state.

After the second clutch C2 is brought to the connection state, the second switching lever 62 which is pushed by the door position interlocking cable 65 with the further rotation of the latch 73 keeps rotating. At this time, the engagement pin 61a of the second fixing block 61 idly moves at the large diameter groove 63a within a range in the circumferential direction of the large diameter groove 63a so as to maintain the connection state of the second clutch C2 (second clutch-side lost motion).

Figure 8A:
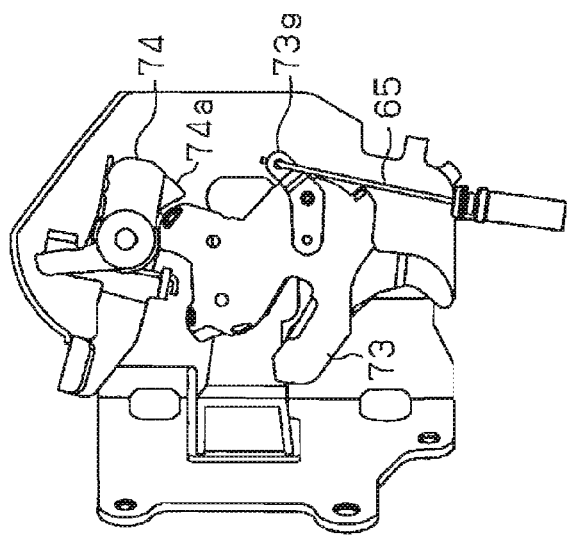
FIGS. 8A, 8B and 8C are explanatory views each of which illustrates an operation of the latch mechanism.

On the other hand, as illustrated in FIG. 8A, in a case where the engagement of the engagement end portion 74a of the pawl 74 with the fully latched engagement surface 73e of the latch 73 is released in the fully closed state of the slide door 20, the inner wall surface of the engagement recess portion 73a is pressed by the striker 75 that is retracting from the engagement recess portion 73a. Thus, the latch 73 starts rotating to the unlatched position from the fully latched position. Then, the latch 73 of the rear lock 33 pulls the door position interlocking cable 65 via the interlocking piece 73g. At this time, as indicated by a shifting from FIG. 6A to FIG. 6B, the arm portion 64 is pulled by the door position interlocking cable 65 and thus the second switching lever 62 rotates in the counterclockwise rotation direction in the drawing. As a result, the second clutch C2 is brought to the disconnection state as mentioned above. It is obvious that the second clutch C2 is brought to the disconnection state after a time period where the engagement pin 61a of the second fixing block 61 idly moves at the large diameter groove 63a within the range in the circumferential direction of the large diameter groove 63a.

In the similar manner, the interlocking piece 73g of the latch 73 is connected to the second switching lever 62 in the fully open lock 34. The second clutch C2 in the fully open lock 34 is operated in the similar manner to that of the rear lock 33 under a condition that "opening" and "closing" in the rear lock 33 are replaced with "closing" and "opening" in the fully open lock 34.

Figure 9A:
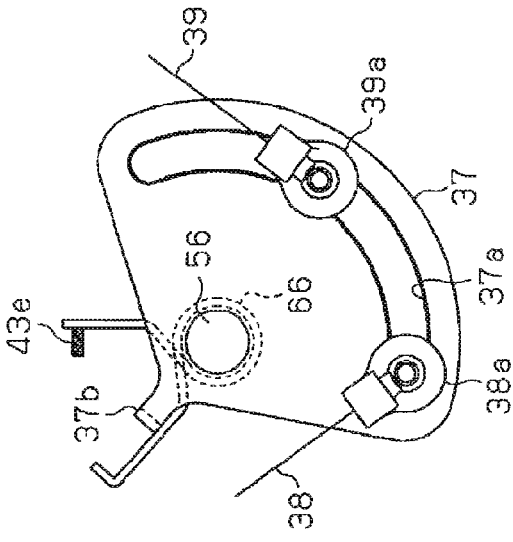
FIGS. 9A, 9B and 9C are explanatory views each of which illustrates an operation of an output lever.
Figure 9B:
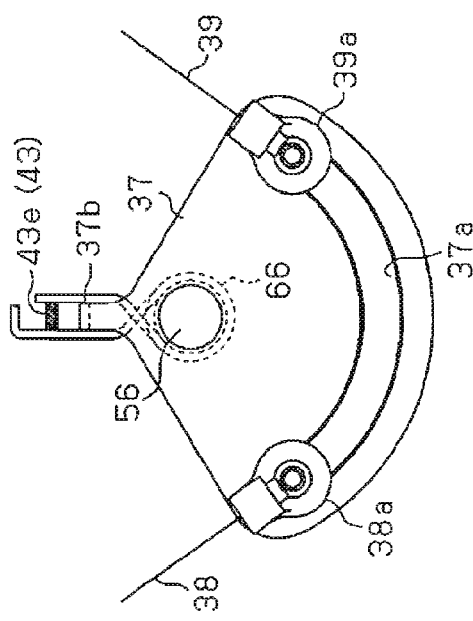
Figure 9C:
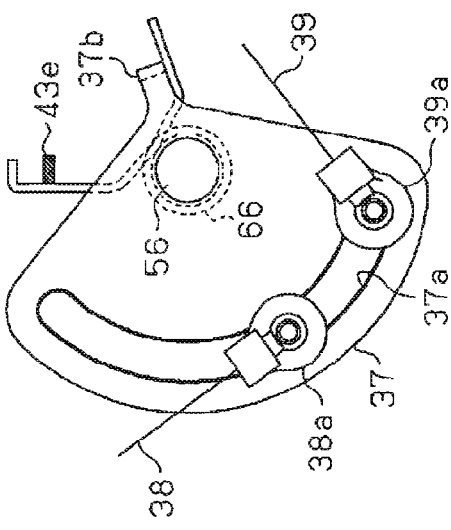

As illustrated in FIGS. 4 and 5, the output lever 37 is connected to a tip end of the second support shaft 56 which penetrates through the accommodation portion 43a so that the output lever 37 integrally rotates with the second support shaft 56. As also illustrated in FIGS. 9A to 9C, a slit 37a as an elongated bore extending in the circumferential direction with reference to the second support shaft 56 is provided at an end portion of the output lever 37. An end 38a of the release cable 38 and an end 39a of the closer cable 39 are inserted to the slit 37a so as not to disengage from the slit 37a.

A movable-side engagement piece 37b in a substantially square plate form bending to one side (back side orthogonal to a paper surface on which FIG. 9 is drawn) is provided at a base end of the output lever 37. The locking housing 43 includes a fixed-side engagement piece 43e substantially in a square plate form configured to face the movable-side engagement piece 37b in the radial direction of the second support shaft 56. A distance from the second support shaft 56 to the fixed-side engagement piece 43e is greater than a distance from the second support shaft 56 to the movable-side engagement piece 37b.

A return spring 66 constituted by a torsion coil spring is wound around the second support shaft 56. Respective ends of the return spring 66 extend in the radial direction to the fixed-side engagement piece 43e, for example, with reference to the second support shaft 56. The respective ends of the return spring 66 are elastically contactable to respective circumferential ends of the fixed-side engagement piece 43e, for example.

As illustrated in FIG. 9A, the return spring 66 biases and holds the output lever 37 in a state where the fixed-side engagement piece 43e and the movable-side engagement piece 37b are arranged side by side in the radial direction. The rotation position of the output lever 37 at this time corresponds to an initial position Ps.

As illustrated in FIG. 9A, in a state where the output lever 37 is held at the initial position Ps, the end 38a of the release cable 38 and the end 39a of the closer cable 39 are arranged at respective circumferential ends of the slit 37a. In the aforementioned state, as illustrated in FIG. 9B, in a case where the output lever 37 rotates in the counterclockwise rotation direction in the drawing (which may be hereinafter also referred to as a "release direction") against a biasing force of the return spring 66, the release cable 38 is pulled. At this time, the release operation force is input to each of the front lock 32, the rear lock 33 and the fully open lock 34 via the mechanical portion 31. On the other hand, because the end 39a idly moves within a range of the slit 37a, the closer cable 39 is inhibited from being pulled (closer-side lost motion).

On the other hand, as illustrated in FIG. 9C, in a case where the output lever 37 rotates from the initial position Ps in the clockwise rotation direction in the drawing (which may be hereinafter also referred to as a "closer direction") against the biasing force of the return spring 66, the closer cable 39 is pulled. At this time, the engagement operation force is input to the latch 73 of the rear lock 33. On the other hand, because the end 38a idly moves within the range of the slit 37a, the release cable 38 is inhibited from being pulled (release-side lost motion).

Next, an operation of the present embodiment is explained. In a case where the slide door 20 is in the open state, at this time, the engagement pin 61a of the second fixing block 61 is positioned at the small diameter groove 63b of the second switching lever 62 which interlocks with the latch 73 of the rear lock 33 at the unlatched position via the door position interlocking cable 65. Thus, the second clutch C2 is in the disconnection state.

In the aforementioned state, in a case where the first clutch C1 is switched to the connection state by the switching actuator 54 and the motor 22 is rotated for closing the slide door 20, the rotation of the worm 44 is transmitted to the drum 23 via the worm wheel portion 45a and the first clutch C1 to thereby start closing operation of the slide door 20.

In a case where the striker 75 enters into the engagement recess portion 73a of the latch 73 with the closing operation of the slide door 20 as illustrated in FIG. 7A, the latch 73 at which the inner wall surface of the engagement recess portion 73a is pressed by the striker 75 starts rotating from the unlatched position. In addition, the second switching lever 62 pressed by the interlocking piece 73g of the latch 73 of the rear lock 33 via the door position interlocking cable 65 starts rotating. Then, in a case where the latch 73 rotates close to the half latched position, the large diameter groove 63a of the second switching lever 62 reaches the engagement pin 61a of the second fixing block 61. The second clutch C2 is switched to the connection state accordingly.

Next, in a case where the first clutch C1 is switched to the disconnection state by the switching actuator 54 and the motor 22 is continuously rotated, the rotation of the worm 44 is transmitted to the output lever 37 via the worm wheel portion 45a and the second clutch C2. Accordingly, the output lever 37 rotates in the closer direction from the initial position Ps. The closer cable 39 is pulled so that the engagement operation force is input to the latch 73 of the rear lock 33.

Figure 7B:
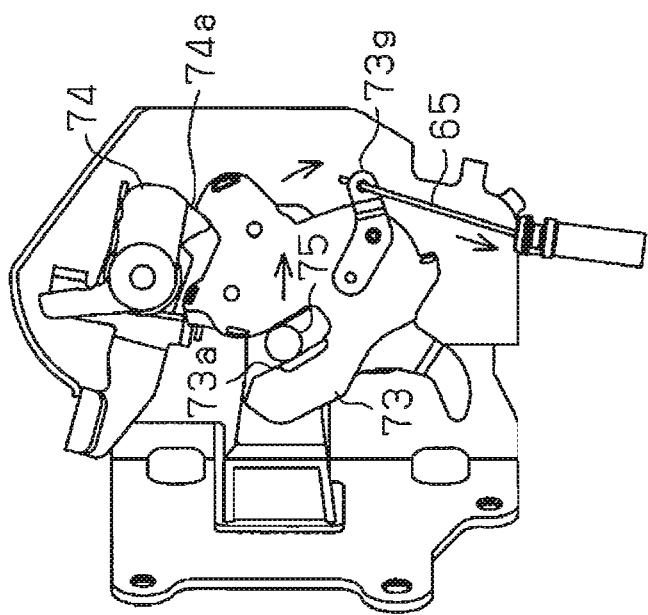

In association with the above, as illustrated in FIG. 7B, the latch 73 of the rear lock 33 rotates to the fully latched position while pulling in the striker 75 and the engagement end portion 74a of the pawl 74 engages with the fully latched engagement surface 73e. Accordingly, the latch mechanism 70 is brought to the fully latched state. The slide door 20 is held in the fully closed state. In the fully latched state of the latch mechanism 70, the latch 73 maintains the fully latched position. Thus, even when the motor 22 is stopped, the second clutch C2 maintains the connection state. In addition, when the motor 22 is stopped, the output lever 37 is biased by the return spring 66 so as to return to the initial position Ps. The latch mechanism 70 of the front lock 32 is brought to the fully latched state so as to conform to the closing operation of the slide door 20 by the rear lock 33.

While the latch 73 is rotating to the fully latched position, the second switching lever 62 which is pressed via the door position interlocking cable 65 keeps rotating. At this time, the second clutch-side lost motion where the engagement pin 61a of the second fixing block 61 idly moves at the large diameter groove 63a is generated as mentioned above. In a case where the engagement operation force is input to the latch 73 of the rear lock 33, the release-side lost motion where the end 38a of the release cable 38 idly moves at the slit 37a is generated. Thus, the release operation force is inhibited from being input to each of the front lock 32, the rear lock 33 and the fully open lock 34.

Next, in a case where the slide door 20 is in the fully closed state, at this time, the second clutch C2 is in the connection state as mentioned above. In the aforementioned state, when the motor 22 is rotated so that the release operation force is input to each of the front lock 32, the rear lock 33 and the fully open lock 34 with the first clutch C1 being disconnected, the rotation of the worm 44 is transmitted to the output lever 37 via the worm wheel portion 45a and the second clutch C2. Accordingly, the output lever 37 rotates in the release direction from the initial position Ps to pull the release cable 38. The release operation force is input to each of the front lock 32, the rear lock 33 and the fully open lock 34 via the mechanical portion 31.

Figure 8B:
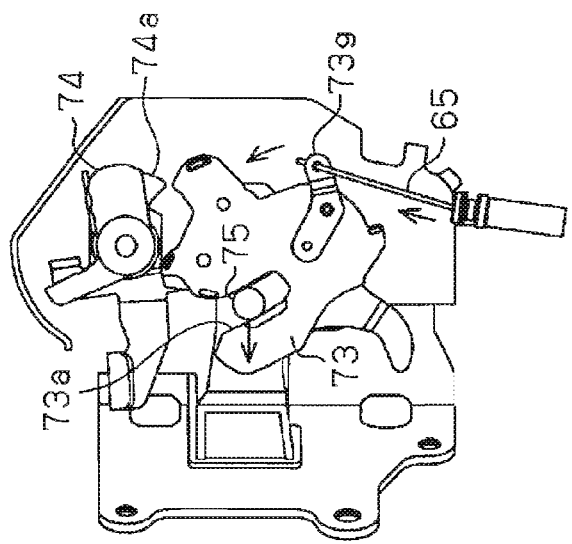
Figure 8C:
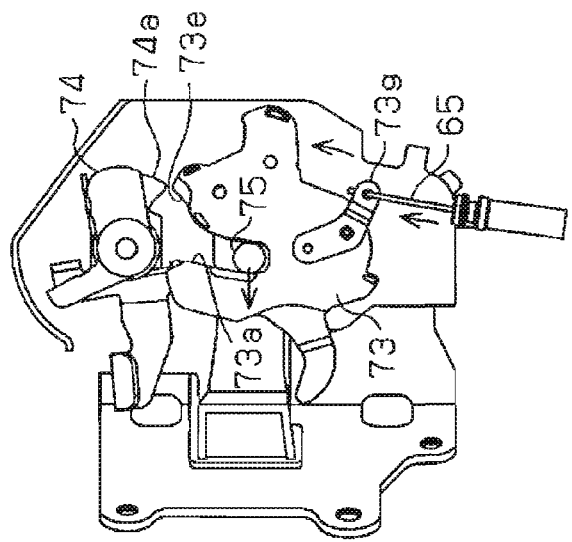

In association with the above, in a case where the engagement of the engagement end portion 74a of the pawl 74 with the fully latched engagement surface 73e is released as illustrated in FIG. 8A, the striker 75 which is retracting from the engagement recess portion 73a pushes the inner wall surface of the engagement recess portion 73a. Thus, the latch 73 starts rotating from the fully latched position to the unlatched position. In addition, the second switching lever 62 which is pulled by the interlocking piece 73g of the latch 73 of the rear lock 33 via the door position interlocking cable 65 starts rotating. As illustrated in FIG. 8B, in a case where the latch 73 rotates beyond the half latched position, the small diameter groove 63b of the second switching lever 62 reaches the engagement pin 61a of the second fixing block 61. The second clutch C2 is switched to the disconnection state accordingly. In a case where the second clutch C2 is switched to the disconnection state, the output lever 37 is biased by the return spring 66 so as to return to the initial position Ps. The second switching lever 62 keeps rotating until the latch 73 of the rear lock 33 reaches the unlatched position as illustrated in FIG. 8C. At this time, the second clutch-side lost motion where the engagement pin 61a of the second fixing block 61 idly moves at the large diameter groove 63a is generated.

Next, in a case where the first clutch C1 is switched to the connection state by the switching actuator 54 and the motor 22 is continuously rotated, the rotation of the worm 44 is transmitted to the drum 23 via the worm wheel portion 45a and the first clutch C1. The opening operation of the slide door 20 is then started. In association with the opening operation of the slide door 20, the latch 73 of the fully open lock 34 is brought to the fully latched state while pulling in the striker 75, thereby holding the slide door 20 in the fully open state.

As mentioned above, in the fully open lock 34, the second clutch C2 is operated in the same way as the rear lock 33. Thus, the second clutch C2 is brought to the connection state in the fully open state of the slide door 20. Thus, in the closing operation of the slide door 20, the motor 22 is rotated so that the release operation force is input to each of the front lock 32, the rear lock 33 and the fully open lock 34. In addition, upon switching of the second clutch C2 to the disconnection state, the first clutch C1 is brought to the connection state and the motor 22 is rotated in an opposite direction. Accordingly, the rotation of the worm 44 is transmitted to the drum 23 via the worm wheel portion 45a and the first clutch C1 to thereby start the closing operation of the slide door 20. The shifting of the slide door 20 to the fully closed state with the closing operation of the slide door 20 is as mentioned above.

As mentioned above, according to the embodiment, the following effects are obtainable.

(1) According to the present embodiment, the worm wheel portion 45a, the drum 23, the output lever 37, the first clutch C1 and the second clutch C2 are arranged coaxially with one another. Thus, as compared to a case where such coaxial arrangement is not employed, a decrease in size of the door opening and closing apparatus for the vehicle in a direction orthogonal to the axial direction may be achieved.

(2) The coaxial arrangement as mentioned above may cause an increase in size of the door opening and closing apparatus for the vehicle in the axial direction. In the embodiment, however, the first clutch C1 is housed in the drum 23 and the second clutch C2 is housed in the worm wheel portion 45a. Thus, the increase in size of the door opening and closing apparatus for the vehicle in the axial direction, i.e., the increase in size in a vehicle width direction (door thickness direction) may be restrained. Mountability of the drive member 21 at a vehicle (mountability at a door) may improve. Alternatively, because a door thickness is not necessary to increase for mounting the drive member 21 at the slide door 20, an interior space is restrained from decreasing by the slide door 20.

(3) In the present embodiment, each of the first clutch C1 and the second clutch C2 is constituted by the planetary gear mechanism. Thus, each of the sun gear, the internal gear and the carrier may be employed as either the input shaft, the output shaft or the fixed shaft at the time of the rotation transmission, thereby increasing a design freedom.

(4) In the present embodiment, the sun gears (the first sun gear portion 45b and the second sun gear portion 45c) of both the planetary gear mechanisms are integrally provided at the worm wheel portion 45a, which may lead to reduction of the number of components. In addition, a construction for connecting the worm wheel portion 45a and the sun gears (the first sun gear portion 45b and the second sun gear portion 45c) of both the planetary gear mechanisms is not necessary. Thus, the increase in size in the axial direction, i.e., the increase in size in the vehicle width direction (door thickness direction), may be restrained.

(5) In the present embodiment, the first support shaft 46 supporting the drum 23 and the like related to the opening and closing operation and the second support shaft 56 supporting the output lever 37 and the like related to the release and closer operation are independent from each other. Thus, without being restricted from each other, each of the first support shaft 46 and the second support shaft 56 may be employed as either the input shaft, the output shaft or the fixed shaft at the time of the rotation transmission of the planetary gear mechanism, thereby increasing the design freedom. A torque required for opening and closing the slide door 20 or a rotation speed, for example, may be appropriately secured.

(6) In the present embodiment, the first support shaft 46 and the second support shaft 56 coaxially arranged with each other are independent from each other. Thus, each of the first support shaft 46 and the second support shaft 56 may serve as the output shaft of the corresponding planetary gear, which improves the freedom of a gear layout.

(7) In the present embodiment, the first support shaft 46 and the second support shaft 56 which are independent from each other are utilized so that the drum 23 related to the opening and closing operation and the output lever 37 related to the closer and release operation may both rotate with a sun gear input and a career output including a maximum reduction ratio. Then, the rotation of the output lever 37 which requires a large torque when the slide door 20 is pulled in to the fully closed state, for example, may be obtained with the maximum reduction ratio.

In addition, the first and second clutches C1 and C2 are both secured via the internal gear. Thus, the connection state of each of the first and second clutches C1 and C2 may be maintained with a smaller force than a case where the first and second clutches C1 and C2 are secured via the carrier. Even in a case where a large load is input from the slide door 20, for example, the connection state of the first clutch C1 may be easily maintained.

(8) In the present embodiment, the first support shaft 46 and the second support shaft 56 are independent from each other. Thus, for example, the first clutch C1 related to the opening and closing operation and the second clutch C2 related to the closer and release operation may be individually assembled. A degree of freedom of assembly order or assembly direction may improve. Assembly hours of the drive member 21 may decrease, which may lead to a cost reduction.

(9) In the present embodiment, the first support shaft 46 and the second support shaft 56 are independent from each other. Thus, a pair of sub-assemblies constituted by two divisions of the entire drive member 21 into a side related to the first support shaft 46 and a side related to the second support shaft 56, i.e., a sub-assembly for opening and closing operation and a sub-assembly for release and closer operation, may be configured. In this case, the drive member 21 may be easily assembled with the aforementioned sub-assemblies.

(10) In the present embodiment, the first support shaft 46 and the second support shaft 56 are independent from each other. Thus, a vehicle specification where a release and closer function is only mounted, for example, may be achieved by a simple design change. That is, the aforementioned vehicle specification may be easily achieved by removing the first clutch C1 and the like related to the opening and closing operation.

(11) In the present embodiment, the opening and closing operation and the release and closer operation are realized by switching the output of the single common motor 22 by the first clutch C1 and the second clutch C2. As compared to a case where the opening and closing operation and the release and closer operation are performed by two motors, for example, the number of components, mass and cost may be reduced. The reduction of the mass of the slide door 20 is favorable for a pinching detection, and the like.

(12) In the open state (excluding the fully open state) of the slide door 20, in a case where the motor 22 is rotated in the first direction with the connection state of the first clutch C1 for obtaining the closing operation, and thereafter the first clutch C1 and the second clutch C2 are switched to the disconnection state and the connection state respectively and the motor 22 is continuously rotated in the first direction, the slide door 20 is brought to the fully closed state with the closer operation. In this case, without reversely rotating the motor 22, a transition from the closing operation to the closer operation of the slide door 20 is capable. Thus, a delay of an operation start caused by a reverse rotation of the motor or a complex control may be restrained.

In addition, in the fully closed state of the slide door 20, in a case where the motor 22 is rotated in the second direction with the connection state of the second clutch C2 for obtaining the release operation, and thereafter the first clutch C1 and the second clutch C2 are switched to the connection state and the disconnection state respectively and the motor 22 is continuously rotated in the second direction, the slide door 20 is brought to the fully open state with the opening operation. In this case, without reversely rotating the motor 22, a transition from the release operation to the opening operation of the slide door 20 is capable. Thus, the delay of the operation start caused by the reverse rotation of the motor or the complex control may be restrained.

(13) Because the first clutch C1 and the second clutch C2 are independently switchable from each other, the opening and closing operation and the release and closer operation may be independently performed. Thus, states where the first and second cables 24 and 25 are stretched during the release operation, the release cable 38 and the closer cable 39 are continuously pulled during the opening and closing operation, for example, may be restrained.

(14) In a case where the slide door 20 is manually opened and closed, as long as the rotation of the first ring gear 48 is switched to a state where the rotation of the first ring gear 48 is permitted by the first fixing block 51, the rotation of the drum 23 (first carrier 49) is permitted while the first ring gear 48 is idly rotating. Accordingly, because a rotation torque from the drum 23 and a drive torque from the motor 22 are separated from each other by the first fixing block 51 and the like, the slide door 20 may be opened and closed with a small operation force.

(15) A switching between a state where the rotation of the first ring gear 48 is restricted and a state where the rotation of the first ring gear 48 is permitted by the first fixing block 51 and the like is electrically performed by the switching actuator 54. Thus, a burden caused by a manual operation may be eliminated.

(16) In the present embodiment, the switching between the state where the rotation of the first ring gear 48 is restricted and the state where the rotation of the first ring gear 48 is permitted by the first fixing block 51 and the like is achieved by the switching actuator 54, for example, with a small size including the small number of components. Thus, as compared to the electromagnetic clutch, for example, the reduced cost and weight are achievable.

(17) In the present embodiment, the motor housing 41 includes the penetration bore A1 connecting through the first accommodation void S1 and the second accommodation void S2. The penetration bore A1 includes the diameter greater than the diameter of the first sun gear portion 45b of the first clutch C1. Thus, while the first accommodation void S1 and the second accommodation void S2 are divided from each other, an assembly of members in the axial direction is achievable.

(18) In the present embodiment, the first sun gear portion 45b and the second sun gear portion 45c of the worm wheel 45 formed of a resin material include the different diameters from each other. Thus, a generation of shrinkage upon forming is unlikely to occur. In addition, the second sun gear portion 45c including the smaller diameter is used at the second clutch C2 at the output side where a high reduction ratio is required. Thus, without the increase of the diameter of the second ring gear 57, for example, a high reduction ratio may be obtained.

Second Embodiment

A second embodiment of the door opening and closing apparatus for the vehicle is explained with reference to FIGS. 10 and 11. The second embodiment includes a construction where the drive member of the first embodiment is modified. Thus, detailed explanations for the similar portions to the first embodiment are omitted.

Figure 10:
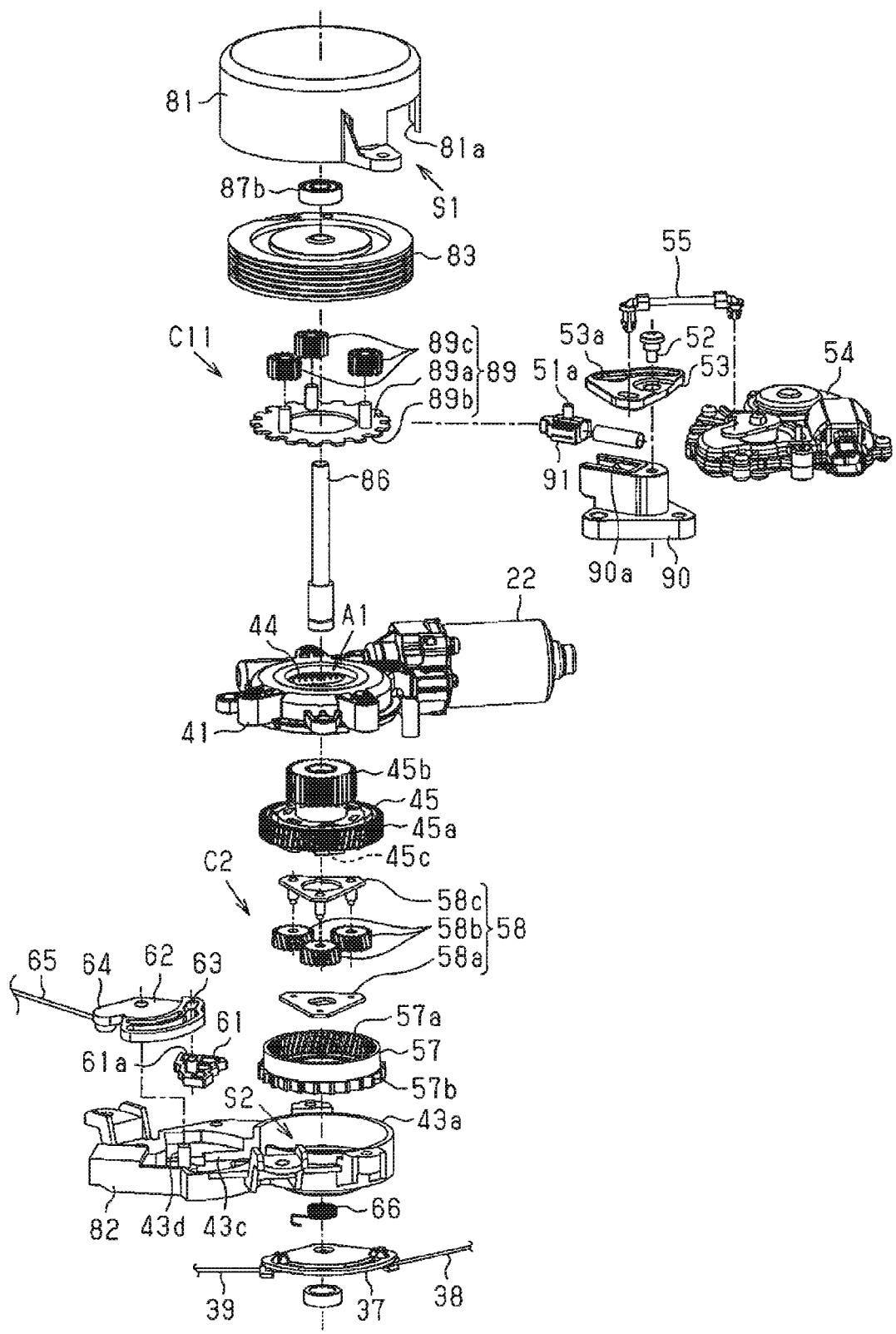
FIG. 10 is an exploded perspective view illustrating a drive member according to a second embodiment of the present invention.
Figure 11:
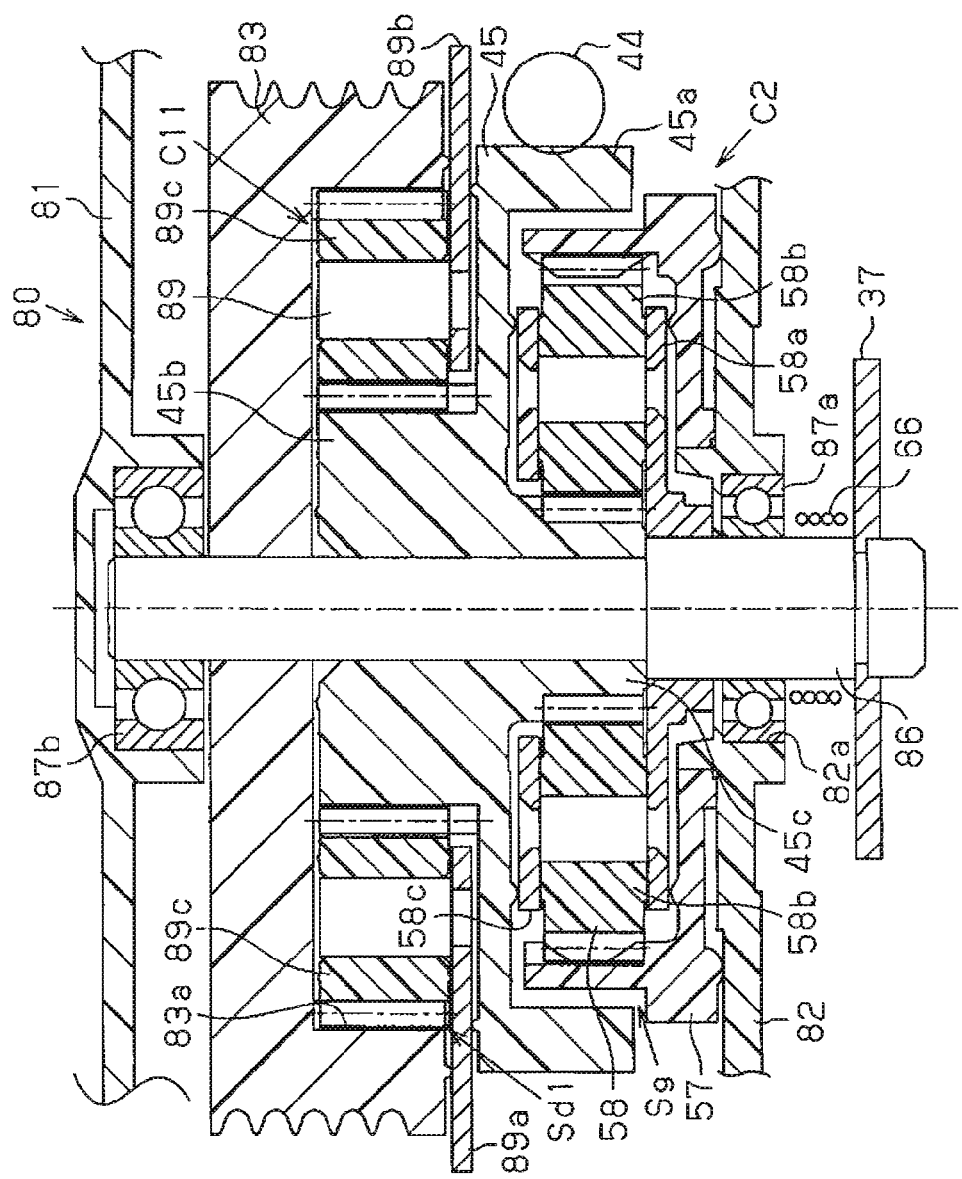
FIG. 11 is a longitudinal section view illustrating the drive member in FIG. 10.

As illustrated in FIGS. 10 and 11, a drive member 80 of the present embodiment includes the motor housing 41, a drum cover 81 serving as the first housing and a locking housing 82 serving as the second housing. The aforementioned members 41, 81 and 82 constitute an outer configuration of the drive member 80.

The drum cover 81, which is formed of a resin material, for example, is formed in a substantially cylindrical configuration including a lid wall portion and opening downward. The drum cover 81 houses a drum 83 serving as the pulley so that the drum 83 is rotatable in a state where the drum cover 81 is fixed to an upper side surface of the motor housing 41. That is, the drum 83 is rotatably supported at a support shaft 86 which is arranged to be coaxial with the worm wheel 45. One end of the support shaft 86 is inserted to and pivotally supported at a bearing 87a which is fitted to an attachment bore 82a in a boss form provided at the locking housing 82 (bottom wall portion of the accommodation portion 43a). The other end of the support shaft 86 is inserted to and pivotally supported at a bearing 87b which is fitted to the lid wall portion of the drum cover 81. Accordingly, the drum 83 is rotatable within the drum cover 81. The drum cover 81 and the locking housing 82 constitute a support member. The support shaft 86 is inserted to and pivotally supported at the worm wheel 45 between the motor housing 41 and the drum 83. That is, the worm wheel 45 is rotatably supported at the motor housing 41 and the locking housing 82 via the support shaft 86.

The drum 83 is formed in a substantially cylindrical configuration including a lid wall portion and opening downward. The drum 83 includes a first internal gear 83a provided at an inner peripheral portion and forms an accommodation void Sd1. A first carrier 89 constituting, together with the first sun gear portion 45b, a planetary gear mechanism is housed in the accommodation void Sd1. The first sun gear portion 45b, the first internal gear 83a and the first carrier 89 constitute a first clutch C11.

The first carrier 89 includes a first holding plate 89a in a substantially annular form into which the first sun gear portion 45b is loosely inserted and positioned. The first holding plate 89a includes a large gear 89b which protrudes radially outward than an opening end surface of the drum 83 and which is provided at an outer circumferential portion of the first holding plate 89a. The first carrier 89 also includes three of first planetary gears 89c respectively rotatably supported at the first holding plate 89a. The first planetary gears 89c are retained between the drum 83 and the first holding plate 89a so as not to disengage in the axial direction. In a state where the first carrier 89 is inserted to be positioned within the drum 83, three of the first planetary gears 89c are meshed with the first internal gear 83a. In a state where the first sun gear portion 45b is inserted to be positioned within the first carrier 89, three of the first planetary gears 89c engage with the first sun gear portion 45b.

As illustrated in FIG. 10, the drum cover 81 houses the first clutch C11 in addition to the drum 83. The drum cover 81 includes a guide bore 81a which opens in the radial direction so as to include a position of the large gear 89b in the axial direction. A guide block 90 is fixed to the drum cover 81 (or the motor housing 41) in a state facing the guide bore 81a in the radial direction. The guide block 90 includes a first guide groove 90a opening in the radial direction of the drum cover 81 at the position of the guide bore 81a. A first fixing block 91 is movably mounted to the first guide groove 90a.

In a case where the first fixing block 91 moves at the first guide groove 90a in the first direction where the first fixing block 91 approaches the first carrier 89, the first fixing block 91 engages with the large gear 89b so that the first carrier 89 becomes non-rotatable. At this time, the first sun gear portion 45b, the first internal gear 83a and the first carrier 89 function as the input shaft, the output shaft and the fixed shaft of the planetary gear mechanism. The rotation of the first sun gear portion 45b (worm wheel 45) is transmittable to the first internal gear 83a (drum 83). The aforementioned state corresponds to a connection state of the first clutch C11.

On the other hand, in a case where the first fixing block 91 moves at the first guide groove 90a in the second direction where the first fixing block 91 separates from the first carrier 89, the first fixing block 91 disengages from the large gear 89b so that the large gear 89b becomes rotatable. At this time, the rotation of the first sun gear portion 45b (worm wheel 45) is not transmittable to the first carrier 89. The aforementioned state corresponds to a disconnection state of the first clutch C1.

The first fixing block 91 is connected to the switching actuator 54 in the similar manner to the first embodiment to be selectively driven to move in the first direction and the second direction. In addition, the second clutch C2 (the second sun gear portion 45c, the second ring gear 57 and the second carrier 58) is housed in the accommodation void Sg in the same way as the first embodiment. At this time, however, the second carrier 58 (second holding plate 58*a*) is connected to the support shaft 86 so as to integrally rotate therewith. The second clutch C2 is brought to the connection state or the disconnection state with the rotation of the second switching lever 62 as mentioned above. Further, the output lever 37 is connected to a tip end of the support shaft 86 which penetrates through the locking housing 82 (a bottom wall portion of the accommodation portion 43*a*) to integrally rotate with the support shaft 86.

The other constructions and operations are the same as those of the aforementioned first embodiment as in FIGS. 1-3, 6-9 and explanations related thereto. As mentioned above, according to the present embodiment, the following effects are obtainable in addition to the effects (1), (3), (4), (11) to (18) according to the first embodiment.

(19) In the first embodiment, the first support shaft 46 and the second support shaft 56 which support the first clutch C1 and the second clutch C2 respectively and which are independent from each other are coaxially arranged. In addition, the single worm wheel 45 is connected to respective end portions of the support shafts 46 and 56 facing each other (see FIG. 5). According to such construction, however, each of the first support shaft 46 and the second support shaft 56 is supported at the housing (42, 43) via only one end. It may be difficult to stably support the opposed ends of each of the support shafts 46 and 56. Thus, accuracy for arranging respective axes of the first support shaft 46 and the second support shaft 56, i.e., respective axes of the first clutch C1 and the second clutch C2, decreases. As a result, noise may be generated by looseness of the slide door 20 during the opening and closing operation thereof.

On the other hand, according to the present embodiment, the first clutch C11 and the second clutch C2 are supported by the common support shaft 86 which is inserted to be positioned within the first clutch C11 and the second clutch C2. The opposed ends of the support shaft 86 may be stably supported by the housing (81, 82). As a result, the accuracy for arranging the respective axes of the first clutch C11 and the second clutch C2 may further improve. In addition, the worm wheel 45 is also supported by the support shaft 86 which is inserted to be positioned within the worm wheel 45. Thus, the support shaft 86 may stably support a load relative to the worm wheel 45 in the radial direction, which restrains looseness of the worm wheel 45 in the radial direction and a positional displacement of the worm wheel 45. Accuracy for arranging an axis of the worm wheel 45 may improve.

(20) In the present embodiment, the output lever 37 integrally rotates with the support shaft 86 of which opposed ends are supported by the drum cover 81 and the locking housing 82. Thus, accuracy for arranging an axis of the output lever 37 may improve.

(21) In the present embodiment, even in a case where the drum 83 is incorporated within the drum cover 81, for example, ends of the first cable 24 and the second cable 25 may be easily led out from the drum cover 81. Thus, assembly performance of the ends of the first cable 24 and the second cable 25 is not deteriorated. On the other hand, in a case where the output lever 37 is incorporated within the locking housing 82, depending on a connection structure between the output lever 37 and the mechanical portion 31, for example, assembly of such members may be possibly difficult. In the present embodiment, the support shaft 86 is connected to the output lever 37 so as to integrally rotate therewith. Specifically, the tip end of the support shaft 86 protrudes outward from the locking housing 82 so that the output lever 37 is connected to the support shaft 86 at the outer side of the locking housing 82. As a result, assembly of the members may be easily performed.

(22) In the present embodiment, the first clutch C11, the second clutch C2, the worm wheel 45, the drum 83 and the output lever 37 are supported by the common support shaft 86 which is inserted to be positioned within the first clutch C11, the second clutch C2, the worm wheel 45, the drum 83 and the output lever 37. Thus, the first clutch C11, the second clutch C2, the worm wheel 45, the drum 83 and the output lever 37 may be easily assembled by overlapping in order from one direction of the support shaft 86.

(23) In the present embodiment, the output lever 37 related to the release and closer operation may rotate with a sun gear input and a carrier output including a maximum reduction ratio. Then, the rotation of the output lever 37 which requires a large torque when the slide door 20 is pulled to the fully closed state, for example, is performed with the maximum reduction ratio.

(24) An operation range (rotation range) and an operation time of the output lever 37 related to the release and closer operation is small. Thus, the support shaft 86 which integrally rotates with the output lever 37 may be used substantially equal to the fixed shaft, which may simplify a support structure of the support shaft 86. It may be possible not to employ a bearing structure such as a bearing (rolling bearing), for example, with high durability and high cost. In addition, an abrasion caused by the rotation of the support shaft 86 itself may be restrained. Thus, the abrasion of the support shaft 86 may be localized.

Third Embodiment

A third embodiment of the door opening and closing apparatus for the vehicle is explained with reference to FIG. 12. The third embodiment includes a construction where the drive member of the second embodiment is modified. A difference from the construction illustrated in FIG. 11 related to the second embodiment is mainly explained below.

Figure 12:
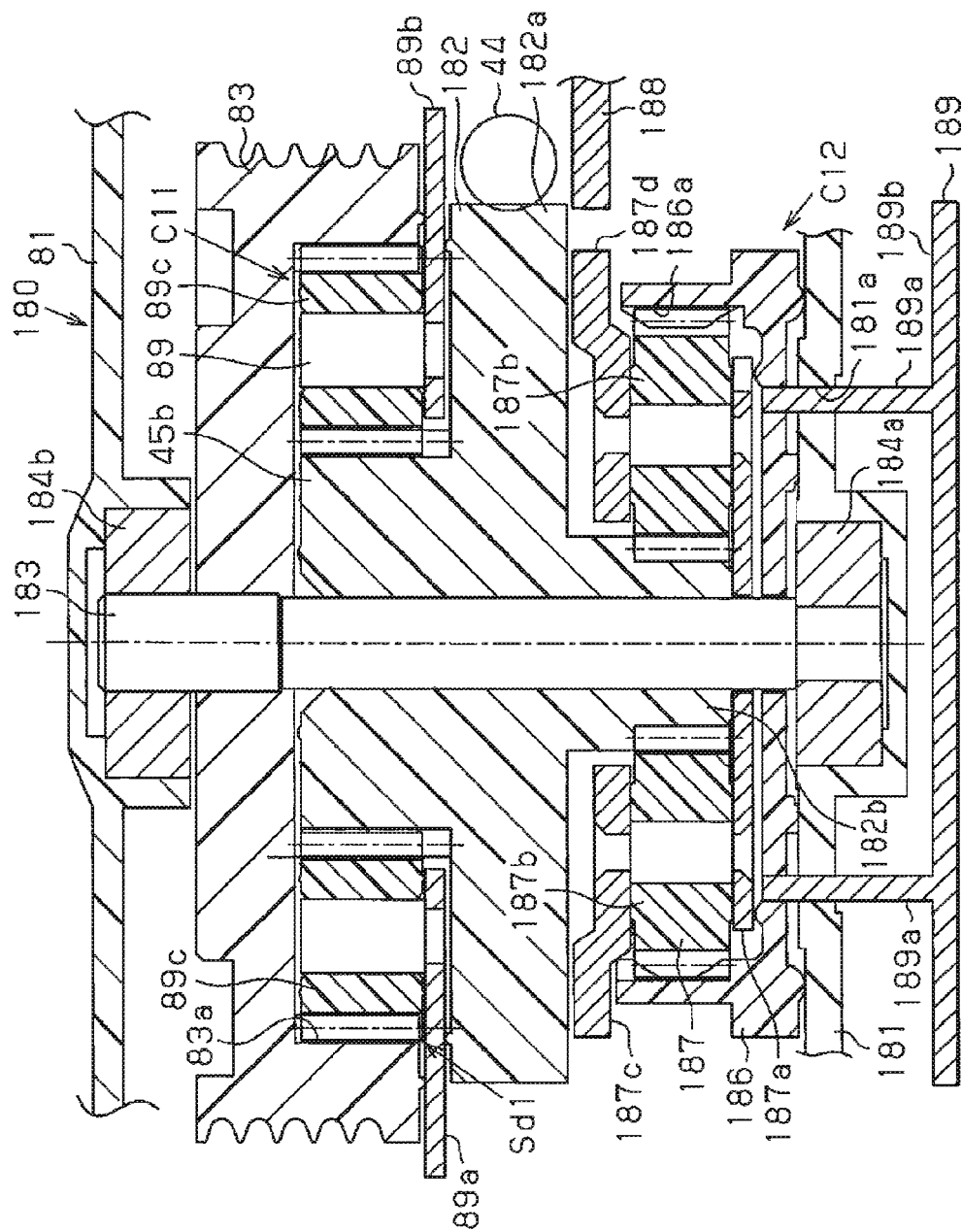
FIG. 12 is a longitudinal section view illustrating a drive member according to a third embodiment of the present invention.

As illustrated in FIG. 12, a drive member 180 of the present embodiment includes the motor housing 41, the drum cover 81 and a locking housing 181 which is made of a resin material, for example. The aforementioned members 41, 81 and 181 constitute an outer configuration of the drive member 180. The drive member 180 includes a worm wheel 182 corresponding to the worm wheel 45. The worm wheel 182 includes a worm wheel portion 182*a* serving as the transmission gear meshed with the worm 44. The motor housing 41 houses the worm wheel portion 182*a* so that the worm wheel portion 182*a* is rotatable. The worm wheel 182 integrally includes the first sun gear portion 45*b* and a second sun gear portion 182*b* which protrudes downward from the worm wheel portion 182*a* in a state being coaxial with the worm wheel portion 182*a*.

The worm wheel 182 is rotatably supported, together with the drum 83, at a support shaft 183 which is coaxially arranged with the worm wheel 182. That is, one end of the support shaft 183 is non-rotatably press-fitted to a bush 184*a* which is fitted to the locking housing 181 and which includes a substantially cylindrical form. The other end of the support shaft 183 is non-rotatably press-fitted to a bush 184*b* which is fitted to the lid wall portion of the drum cover 81 and which includes a substantially cylindrical form. The drum cover 81 and the locking housing 181 constitute the support member. The support shaft 183 is inserted to and pivotally supported by the worm wheel 182 and the drum 83 between the locking housing 181 and the drum cover 81. Accordingly, the worm wheel 182 and the drum 83 are rotatably supported by the support shaft 183. The support shaft 183 may be configured to be directly press-fitted to the locking housing 181 and the drum cover 81 without via the bush 184b.

A second ring gear 186 and a second carrier 187 are housed between the worm wheel portion 182a and the locking housing 181. The second sun gear portion 182b, the second ring gear 186 and the second carrier 187 constitutes a second clutch C12.

The second ring gear 186 is formed in a substantially cylindrical configuration including a bottom wall portion and opening upward. The second ring gear 186 includes a second internal gear 186a formed at an inner peripheral portion. The second internal gear 186a constitutes, together with the second sun gear portion 182b and the second carrier 187, a planetary gear mechanism.

The second carrier 187 includes a second holding plate 187a in an annular form rotatably supported at the support shaft 183 and plural second planetary gears 187b rotatably supported at the second holding plate 187a. The second carrier 187 also includes a second carrier plate 187c in an annular form that inhibits the plural second planetary gears 187b from disengaging in the axial direction between the second carrier plate 187c and the second holding plate 187a. In a state where the second carrier 187 is inserted to be positioned within the second ring gear 186, the plural second planetary gears 187b are meshed with the second internal gear 186a. In a state where the second sun gear portion 182b is inserted to be positioned within the second carrier 187, the plural second planetary gears 187b are meshed with the second sun gear portion 182b.

The second carrier plate 187c protrudes radially outward than an opening end surface of the second ring gear 186. The second carrier plate 187c includes a large gear 187d provided at an outer peripheral portion of the second carrier plate 187c. A second fixing block 188 corresponding to the second fixing block 61 is movably mounted at the locking housing 181 of the present embodiment at a position corresponding to the large gear 187d in the axial direction. In a case where the second fixing block 188 moves in the first direction approaching the second carrier 187, the second fixing block 188 engages with the large gear 187d so that the second carrier 187 becomes non-rotatable. At this time, the second sun gear portion 182b, the second internal gear 186a and the second carrier 187 function as the input shaft, the output shaft and the fixed shaft of the planetary gear mechanism. The rotation of the second sun gear portion 182b (worm wheel 182) is transmittable to the second internal gear 186a (second ring gear 186). The aforementioned state corresponds to a connection state of the second clutch C12. On the other hand, in a case where the second fixing block 188 moves in the second direction separating from the second carrier 187, the second fixing block 188 disengages from the large gear 187d so that the second carrier 187 becomes rotatable. At this time, the rotation of the second sun gear portion 182b (worm wheel 182) is not transmittable to the second internal gear 186a (second ring gear 186). The aforementioned state corresponds to a disconnection state of the second clutch C12.

An output lever 189 corresponding to the output lever 37 is connected to the second ring gear 186 so as to integrally rotate therewith. The output lever 189 includes a pair of column portions 189a which are symmetrically disposed with reference to an axis of the support shaft 183 and which are arranged to stand at the second ring gear 186 while extending in parallel with the axis of the support shaft 183. The output lever 189 also includes a plate portion 189b connecting between respective tip ends of the column portions 189a in a state where the plate portion 189 expands in a direction substantially orthogonal to the axis of the support shaft 183. The slit 37a is provided at the plate portion 189b so that the end 38a of the release cable 38 and the end of the closer cable 39 are inserted to the slit 37 in a state not to disengage from the slit 37a (see FIGS. 9A to 9C).

Accordingly, in the similar manner to the first and second embodiments, in a case where the output lever 189 rotates in the release direction from the initial position, the release operation force is input to the front lock 32, the rear lock 33 and the fully open lock 34 via the mechanical portion 31. On the other hand, in a case where the output lever 189 rotates in the closer direction from the initial position, the engagement operation force is input to the latch 73 of the rear lock 33. The plate portion 189b is disposed at the outer side of the locking housing 181. The locking housing 181 includes a guide bore 181a in a substantially arc form allowing movements of the respective column portions 189a within an operation range (rotation range) of the output lever 189.

The other constructions and operations are the same as those of the first embodiment as in FIGS. 1-3, 6-9 and explanations related thereto. As mentioned above, according to the present embodiment, the following effects are obtainable in addition to the effects (1), (3), (4), (11)-(18) according to the first embodiment and the effects (19) and (22) according to the second embodiment.

(25) In the present embodiment, the support shaft 183 is non-rotatably supported at the locking housing 181 and the drum cover 81. Thus, as compared to a case where the support shaft 183 is rotatably supported at the locking housing 181, for example, a support structure of the support shaft 183 may be simplified. That is, a bearing (rolling bearing) and the like with high durability and high cost is not necessarily employed. The simple bushes 184a and 184b may favorably satisfy a support performance. In addition, an abrasion caused by the rotation of the support shaft 183 itself may be restrained. Thus, the abrasion of the support shaft 183 may be localized.

Further, the opposed ends of the support shaft 183 are fixed to the locking housing 181 and the like, so that looseness is unlikely to be generated at a support portion (bush 184a, 184b). Accuracy for arranging the axis of the support shaft 183 may further improve.

Fourth Embodiment

A fourth embodiment of the door opening and closing apparatus for the vehicle is explained with reference to FIG. 13. The fourth embodiment includes a construction where the drive member of the third embodiment is modified. A difference from the construction illustrated in FIG. 12 related to the third embodiment is mainly explained below.

Figure 13:
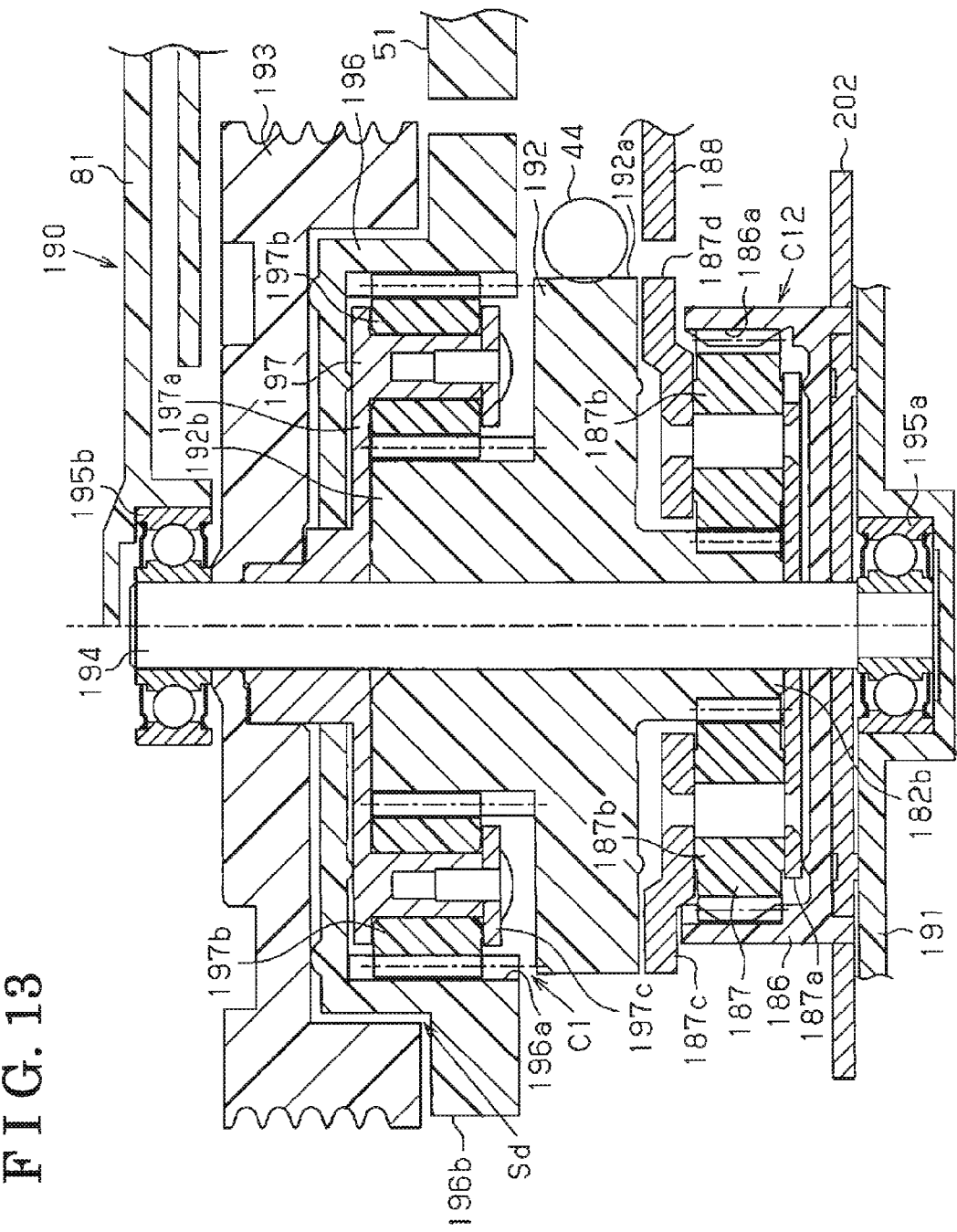
FIG. 13 is a longitudinal section view illustrating a drive member according to a fourth embodiment of the present invention.

As illustrated in FIG. 13, a drive member 190 of the embodiment includes the motor housing 41, the drum cover 81 and a locking housing 191. The aforementioned members 41, 81 and 191 constitute an outer configuration of the drive member 190. The drive member 190 includes a worm wheel 192 corresponding to the worm wheel 182. The worm wheel 192 includes a worm wheel portion 192a serving as the transmission gear meshed with the worm 44. The motor housing 41 houses the worm wheel portion 192a so that the worm wheel portion 192a is rotatable. The worm wheel 192 integrally includes the second sun gear portion 182b and a first sun gear portion 192b which protrudes upward from the worm wheel portion 192a in a state being coaxial with the worm wheel portion 192a.

A drum 193 similar to the drum 23 of the first embodiment is fixed to a support shaft 194 so as to integrally rotate therewith. The support shaft 194 is arranged coaxially with the worm wheel 192. One end of the support shaft 194 is inserted to and pivotally supported at a bearing 195a which is fitted to the locking housing 191. The other and of the support shaft 194 is inserted to and pivotally supported at a bearing 195b which is fitted to the lid wall portion of the drum cover 81. The drum 193 is rotatable within the drum cover 81 accordingly. The drum cover 81 and the locking housing 191 constitute the support member.

The support shaft 194 is inserted to and pivotally supported at the worm wheel 192 between the locking housing 191 and the drum 193. That is, the worm wheel 192 is supported to be rotatable at the support shaft 194.

The drum 193 is formed in a substantially cylindrical configuration including a lid wall portion and opening downward to form the accommodation void Sd. Because an axial length and a diameter of the drum 193 are large, an inner peripheral portion of the drum 193 is convenient to be used as an accommodation void. A first ring gear 196 and a first carrier 197 are housed in the accommodation void Sd. The first sun gear portion 192b, the first ring gear 196 and the first carrier 197 constitute the first clutch C1 similar to that of the first embodiment.

The first ring gear 196 is formed in a substantially cylindrical configuration including a lid wall portion and opening downward. The first ring gear 196 includes a first internal gear 196a provided at an inner peripheral portion of the first ring gear 196 and a large gear 196b in an annular form covering an opening end surface of the drum 193. The large gear 196b protrudes radially outward from an axial end of the first ring gear 196 projecting from the accommodation void Sd. The first internal gear 196a constitutes, together with the first sun gear portion 192b and the first carrier 197, a planetary gear mechanism.

The first carrier 197 includes a first holding plate 197a in an annular form fixed to the support shaft 194 to integrally rotate therewith and plural first planetary gears 197b rotatably supported at the first holding plate 197a. The first carrier 197 also includes a first carrier plate 197c in an annular form. The first holding plate 197a and the first carrier plate 197c operate in cooperation for retaining plural first planetary gears 197b between the first holding plate 197a and the first carrier plate 197c so that the plural first planetary gears 197b are inhibited from disengaging. In a state where the first carrier 197 is inserted to be positioned within the first ring gear 196, the plural first planetary gears 197b are meshed with the first internal gears 196a. In a state where the first sun gear portion 192b is inserted to be positioned within the first carrier 197, the plural first planetary gears 197b are meshed with the first sun gear portion 192b.

The first fixing block 51 similar to that illustrated in FIG. 4 according to the first embodiment is movably provided at a position corresponding to the large gear 196b in the axial direction. In a case where the first fixing block 51 moves in the first direction approaching the first ring gear 196, the first fixing block 51 engages with the large gear 196b so that the first ring gear 196 becomes non-rotatable. At this time, the first sun gear portion 192b, the first internal gear 196a and the first carrier 197 function as the input shaft, the fixed shaft and the output shaft of the planetary gear mechanism. The rotation of the first sun gear portion 192b (worm wheel 192) is transmittable to the first carrier 197. The aforementioned state corresponds to the connection state of the first clutch C1.

On the other hand, in a case where the first fixing block 51 moves in the second direction separating from the first ring gear 196, the first fixing block 51 disengages from the large gear 196b so that the first ring gear 196 becomes rotatable. At this time, the rotation of the first sun gear portion 192b (worm wheel 192) is not transmittable to the first carrier 197. The aforementioned state corresponds to the disconnection state of the first clutch C1.

The second ring gear 186 and the second carrier 187 which constitute, together with the second sun gear portion 182b, the second clutch C12 are housed between the worm wheel portion 192a and the locking housing 191. An output lever 202 corresponding to the output lever 189 is connected to the second ring gear 186 so as to integrally rotate with the second ring gear 186. The output lever 202 is disposed between the second ring gear 186 and the locking housing 191. The output lever 202 includes the slit 37a to which the end 38a of the release cable 38 and the end 39a of the closer cable 39 are inserted so as not to disengage (see FIGS. 9A to 9C). That is, the output lever 202 is connected to the mechanical portion 31 and the like within the locking housing 191.

The other constructions and operations are the same as those of the first embodiment as in FIGS. 1-3, 6-9 and explanations related thereto. As mentioned above, according to the present embodiment, the following effects are obtainable in addition to the effects (1), (3), (4), (11)-(18) according to the first embodiment and the effects (19) and (22) according to the second embodiment.

(26) In the present embodiment, the drum 193 integrally rotates with the support shaft 194 of which opposed ends are supported by the drum cover 81 and the locking housing 191. Thus, accuracy for arranging an axis of the drum 193 may improve.

(27) In the present embodiment, the drum 193 related to the opening and closing operation may be rotated with the sun gear input and the carrier output including the maximum reduction ratio. The aforementioned embodiments may be modified as follows.

Figure 14:
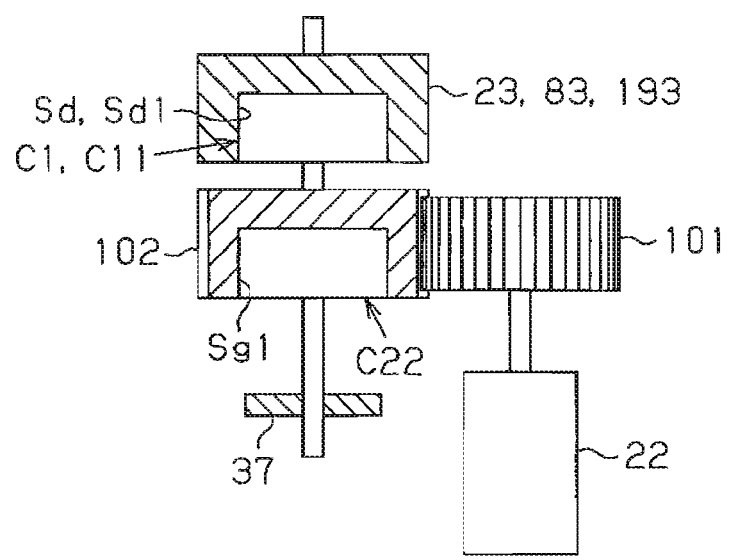
FIG. 14 is a longitudinal section view schematically illustrating a modified example of each of the aforementioned embodiments.

In the aforementioned first to fourth embodiments, as the transmission gear, a second gear 102 constituting a so-called parallel axis gear may be employed together with a first gear 101 which is connected to the rotation shaft of the motor 22 to integrally rotate therewith as illustrated in FIG. 14. The first gear 101 and the second gear 102 are constituted by spur gears or helical gears meshed with each other. Thus, in a case where the motor 22 rotates, the rotation of the motor 22 is transmitted to the second gear 102 via the first gear 101. In this case, the first clutch C1, C11 is also housed in the accommodation void Sd, Sd1 of the drum 23, 83, 193, and the rotation of the second gear 102 is transmittable to the drum 23, 83, 193 via the first clutch C1, C11. In the first and second embodiments, as illustrated in FIG. 14, the second gear 102 is formed in a substantially cylindrical configuration including a lid wall portion to form an accommodation void Sg1 so as to correspond to the worm wheel 45 (worm wheel portion 45a). A second clutch C22 including a construction corresponding to the second clutch C2 is housed in the accommodation void Sg1. The rotation of the second gear 102 is transmittable to the output lever 37 via the second clutch C22. In the third and fourth embodiments, the second gear 102 including a configuration corresponding to the worm wheel 182, 192 may be used.

In the second and third embodiments, the switching between the connection state and the disconnection state of the first clutch C11 may be performed by an appropriate fixing block moving in the radial direction of the first carrier 89 with a circular motion. The fixing block may move electrically by the switching actuator or move manually.

In the second and third embodiments, the switching between the connection state and the disconnection state of the first clutch C11 may be performed by an appropriate fixing block moving substantially in parallel with the axial direction of the first carrier 89. In this case, the motion of the aforementioned fixing block may be a linear motion or a circular motion. In addition, the fixing block may move electrically by the switching actuator or move manually.

In the third and fourth embodiments, the switching between the connection state and the disconnection state of the second clutch C12 may be performed by an appropriate fixing block moving in the radial direction of the second carrier 187 with a circular motion. The fixing block may move electrically by the switching actuator or move manually.

In the third and fourth embodiments, the switching between the connection state and the disconnection state of the second clutch C12 may be performed by an appropriate fixing block moving substantially in parallel with the axial direction of the second carrier 187. In this case, the motion of the fixing block may be a linear motion or a circular motion. In addition, the fixing block may move electrically by the switching actuator or move manually.

In each of the aforementioned embodiments, the switching actuator may be omitted so that the switching between the connection state and the disconnection state of the first clutch may be manually performed. In each of the aforementioned embodiments, the switching between the connection state and the disconnection state of the second clutch may be performed by an exclusive switching actuator in the similar manner to the first clutch.

In each of the aforementioned embodiments, the second internal gear and the second carrier of the second clutch may be configured to function as the output shaft and the fixed shaft of the planetary gear mechanism. In this case, the switching between the connection state and the disconnection state of the second clutch may be performed by an appropriate fixing block moving in the radial direction of the second carrier or by an appropriate fixing block moving substantially in parallel with the axial direction of the second carrier. In addition, the motion of the fixing block may be a linear motion or a circular motion. Further, the fixing block may move electrically by the switching actuator or move manually.

In each of the aforementioned embodiments, the diameters of the first sun gear portion and the second sun gear portion may be specified to be equal to each other. Alternatively, the diameter of the second sun gear portion may be specified greater than the diameter of the first sun gear portion.

In each of the aforementioned embodiments, the first sun gear portion may be separately provided from the worm wheel portion. In this case, an appropriate connection structure may be provided for integrally rotating the first sun gear portion and the worm wheel portion.

In each of the aforementioned embodiments, the first sun gear portion may be configured to be independently rotatable relative to the worm wheel portion. In this case, the first sun gear portion, the first internal gear and the first carrier may be arbitrarily employed as the input shaft, the output shaft and the fixed shaft of the planetary gear mechanism within a range not to overlap one another.

In each of the aforementioned embodiments, the second sun gear portion may be separately provided from the worm wheel portion. In this case, an appropriate connection structure may be provided for integrally rotating the second sun gear portion and the worm wheel portion.

In each of the aforementioned embodiments, the second sun gear portion may be configured to be independently rotatable relative to the worm wheel portion. In this case, the second sun gear portion, the second internal gear and the second carrier may be arbitrarily employed as the input shaft, the output shaft and the fixed shaft of the planetary gear mechanism within a range not to overlap one another.

In each of the aforementioned embodiments, the first clutch or the second clutch may be a friction or tooth electromagnetic clutch. Alternatively, the first clutch or the second clutch may be a so-called peripheral friction type (cone or drum) clutch.

In each of the aforementioned embodiments, the two cables constituted by the first cable 24 and the second cable 25 are utilized as the rope member. Alternatively, the rope member may be constituted by the single cable. In each of the aforementioned embodiments, the drive member may be fixed to the vehicle body 10. For example, in a case where the drive member is mounted to the quarter panel 10b, the tensioners 28 and 29 are desirably connected to the drive member. In a case where the drive member is mounted to a step which exists in the vicinity of a lower edge of the door opening 10a, a belt pulley and a belt are desirably employed as the pulley and the rope member respectively.

The invention claimed is:

1. A door opening and closing apparatus for a vehicle, comprising:
   a transmission gear configured to be driven to rotate by a motor;
   a pulley arranged coaxially with the transmission gear and configured to open and close a vehicle door by moving a rope member with a rotation of the pulley;
   an output member arranged coaxially with the transmission gear and configured to bring a door lock to a holding state in which the vehicle door is held or a release state in which the holding of the vehicle door is released with a rotation of the output member;
   a first clutch housed in the pulley in a state being coaxial with the transmission gear, the first clutch selectively permitting and prohibiting a rotation transmission between the transmission gear and the pulley; and
   a second clutch housed in the transmission gear in a state being coaxial with the transmission gear, the second clutch selectively permitting and prohibiting a rotation transmission between the transmission gear and the output member.

2. The door opening and closing apparatus for the vehicle according to claim 1, wherein the first clutch and the second clutch include planetary gear mechanisms respectively.

3. The door opening and closing apparatus for the vehicle according to claim 2, wherein the planetary gear mechanisms include sun gears respectively which are integrally provided at the transmission gear.

4. The door opening and closing apparatus for the vehicle according to claim 3, comprising:
   a motor housing supporting the motor;
   a first housing constituting, in cooperation with the motor housing, a first accommodation void in which the pulley and the first clutch are housed; and
   a second housing constituting, in cooperation with the motor housing, a second accommodation void in which the transmission gear and the second clutch are housed,
   the motor housing including a penetration bore connecting through the first accommodation void and the second accommodation void, the penetration bore including a diameter greater than a diameter of the sun gear of the first clutch.

5. The door opening and closing apparatus for the vehicle according to claim 3, wherein the transmission gear s formed of a resin material and the sun gears include different diameters from each other.

6. The door opening and closing apparatus for the vehicle according to claim 2, comprising;
a first support shaft supporting, in cooperation with the transmission gear, the pulley and the first clutch; and
a second support shaft being independent from the first support shaft and supporting, in cooperation with the transmission gear, the output member and the second clutch.

7. The door opening and closing apparatus for the vehicle according to claim 1, comprising a single support shaft of which opposed ends are supported by a support member and which supports the transmission gear, the pulley, the output shaft, the first clutch and the second clutch.

8. A door opening and closing apparatus for a vehicle, comprising:
a single support shaft of which opposed ends are supported by a support member;
a transmission gear within which the support shaft is inserted to be positioned and which is configured to be driven to rotate by a motor;
a pulley configured to open and close a vehicle door by moving a rope member with a rotation of the pulley around an axis of the support shaft;
an output member configured to bring a door lock to a holding state in which the vehicle door is held or a release state in which the holding of the vehicle door s released with a rotation of the output member around the axis of the support shaft;
a first clutch within which the support shaft is inserted to be positioned, the first clutch selectively permitting and prohibiting a rotation transmission between the transmission gear and the pulley; and
a second clutch within which the support shaft is inserted to be positioned, the second clutch selectively permitting and prohibiting a rotation transmission between the transmission gear and the output member.

9. The door opening and closing apparatus for the vehicle according to claim 8, wherein the support shaft is connected to one of the pulley and the output member to integrally rotate therewith.

10. The door opening and closing apparatus for the vehicle according to claim 9, wherein the pulley is a drum at which the rope member is wound, the rope member including a first portion which is wound at the drum and which includes an end extending from the drum and a second portion which is wound at the drum and which includes an end extending from the drum,
the drum operating the vehicle door to open and close by reeling out the first portion and reeling in the second portion with a rotation of the drum in one direction, by reeling in the first portion and reeling out the second portion with a rotation of the drum in the other direction,
the output member is an output lever,
the support shaft is connected to the output lever to integrally rotate therewith.

11. The door opening and closing apparatus for the vehicle according to claim 8, wherein the support shaft is supported at the support member to be non-rotatable therewith.

12. The door opening and closing apparatus for the vehicle according to claim 8, wherein at least one of the first clutch and the second clutch includes a planetary gear mechanism.

* * * * *